US011723094B2

(12) United States Patent
Jang et al.

(10) Patent No.: US 11,723,094 B2
(45) Date of Patent: Aug. 8, 2023

(54) METHOD AND DEVICE FOR TRANSMITTING SIGNAL THROUGH MULTI-LINK IN WIRELESS LAN SYSTEM

(71) Applicant: LG ELECTRONICS INC., Seoul (KR)

(72) Inventors: Insun Jang, Seoul (KR); Suhwook Kim, Seoul (KR); Jeongki Kim, Seoul (KR); Kiseon Ryu, Seoul (KR); Sungjin Park, Seoul (KR); Taewon Song, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 195 days.

(21) Appl. No.: 17/266,989

(22) PCT Filed: Aug. 8, 2019

(86) PCT No.: PCT/KR2019/009991
§ 371 (c)(1),
(2) Date: Feb. 8, 2021

(87) PCT Pub. No.: WO2020/032633
PCT Pub. Date: Feb. 13, 2020

(65) Prior Publication Data
US 2021/0315036 A1    Oct. 7, 2021

(30) Foreign Application Priority Data

Aug. 10, 2018 (KR) .................. 10-2018-0094063
Sep. 6, 2018 (KR) .................. 10-2018-0106742

(51) Int. Cl.
*H04W 76/15* (2018.01)
*H04L 1/1867* (2023.01)
(Continued)

(52) U.S. Cl.
CPC .......... *H04W 76/15* (2018.02); *H04L 1/1896* (2013.01); *H04W 74/0816* (2013.01); *H04W 84/12* (2013.01)

(58) Field of Classification Search
CPC . H04W 76/15; H04W 74/0816; H04W 84/12; H04W 74/0808; H04L 1/1896; H04L 1/1887; H04L 5/001; H04L 5/0055
See application file for complete search history.

(56) References Cited

U.S. PATENT DOCUMENTS

| 2018/0054847 A1* | 2/2018 | Cariou | H04W 28/0808 |
| 2019/0082373 A1* | 3/2019 | Patil | H04L 1/1614 |
| 2019/0158413 A1* | 5/2019 | Patil | H04W 88/06 |

FOREIGN PATENT DOCUMENTS

| KR | 20130059391 | 6/2013 |
| KR | 20140068815 | 6/2014 |

(Continued)

OTHER PUBLICATIONS

PCT International Application No. PCT/KR2019/009991, International Search Report dated Nov. 21, 2019, 4 pages.

*Primary Examiner* — Walli Z Butt
(74) *Attorney, Agent, or Firm* — Lee Hong Degerman Kang Waimey

(57) ABSTRACT

A method for operation in a wireless local area network (WLAN) system according to various embodiments may comprise the steps of: determining, by a transmitting device, whether a second link is in an idle state for a first time interval, after receiving an ACK through a first link within a TXOP configured for the first link; aggregating, by the transmitting device, the first link and the second link on the basis of the determination; and transmitting, by the transmitting device, a packet through the aggregated first link and second link.

10 Claims, 28 Drawing Sheets

(51) Int. Cl.
*H04W 74/08* (2009.01)
*H04W 84/12* (2009.01)

(56) References Cited

FOREIGN PATENT DOCUMENTS

| KR | 101621103 | 5/2016 |
|---|---|---|
| WO | 2010134737 | 11/2010 |
| WO | 2017196091 | 11/2017 |

\* cited by examiner

FIG. 1
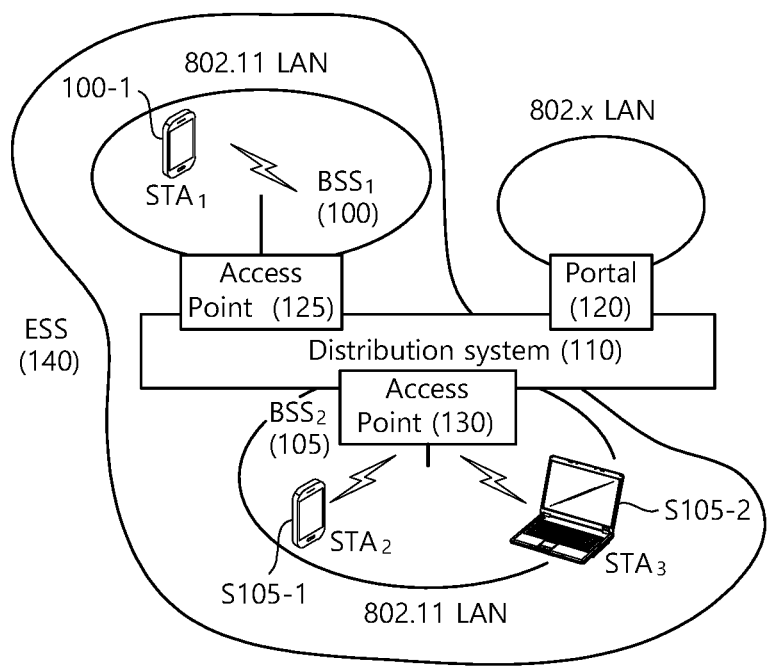
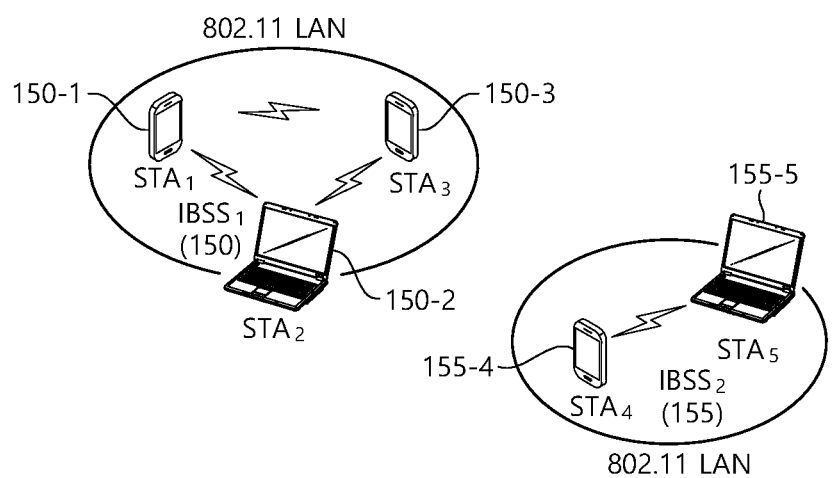

METHOD AND DEVICE FOR TRANSMITTING SIGNAL THROUGH MULTI-LINK IN WIRELESS LAN SYSTEM

CROSS-REFERENCE TO RELATED APPLICATIONS

This application is the National Stage filing under 35 U.S.C. 371 of International Application No. PCT/KR2019/009991, filed on Aug. 8, 2019, which claims the benefit of earlier filing date and right of priority to KR Application Nos. 10-2018-0094063 filed on Aug. 10, 2018, and 10-2018-0106742 filed on Sep. 6, 2018, the contents of which are all incorporated by reference herein in their entirety.

BACKGROUND OF THE DISCLOSURE

Field of the Disclosure

The present disclosure relates to a method of transmitting/receiving signals through multiple links in a wireless local area network (WLAN) system and, more specifically, to a method and device for configuring multiple links and transmitting signals through the configured multiple links.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present disclosure proposes technical features that can improve conventional standards or be used in new communication standards. Various communication schemes were defined in IEEE standard. A transmitting station (STA) can set a transmission opportunity (TXOP) for determining a limited period to access a channel without contention.

SUMMARY

In the conventional IEEE 802.11 standard, signals are transmitted/received through only one channel and thus it is not necessary to transmit signals through a plurality of channels in a TXOP. From the IEEE 802.11be standard, multiple links can be supported. A station (STA) can specify a plurality of links. The STA can aggregate the plurality of links. The STA can transmit a signal through the aggregated plurality of links. When a TXOP for at least one link is set, the STA can additionally aggregate a link into at least one link within the TXOP. The STA can transmit a signal through the aggregated links in the TXOP. In this case, the STA may need to specify the link to be additionally aggregated within the TXOP. Furthermore, when a TXOP for at least one link is set, the STA may need to specify a link for transmitting a signal when the TXOP ends. Specifically, an operation process of the STA according to a BC value for a link through which no signal is transmitted may be required in the TXOP/at the time of ending of the TXOP. An example according to the present disclosure proposes a method and apparatus for transmitting/receiving signals through multiple links in a WLAN system.

Technical features of the present disclosure can be implemented on the basis of a device and/or a method in a wireless local area network (WLAN) system. For example, a method based on the technical features of the present disclosure may include: receiving ACK through a first link in a transmission opportunity set for the first link, and then determining whether a second link is idle for a first time period, a transmitting device; aggregating, by the transmitting device, the first link and the second link on the basis of the determination; and transmitting, by the transmitting device, a packet through the aggregated first and second links.

Advantageous Effects

According to an embodiment of the present disclosure, an STA can determine a link that can be aggregated in a TXOP or at the time of ending of the TXOP and additionally aggregate the link. When the STA determines a link that can be aggregated in the TXOP and additionally aggregates the link, a transmission range can extend. Accordingly, the STA can improve a link utilization rate and transmit data by additionally aggregating the link that can be aggregated. In addition, it is possible to increase a throughput by efficiently using multiple links. According to an example of the present disclosure, a new access method for transmitting signals through multiple links can allow efficient signal transmission.

BRIEF DESCRIPTION OF THE DRAWINGS

FIG. 1 is a conceptual view illustrating a structure of a WLAN.

DESCRIPTION OF EXEMPLARY EMBODIMENTS

Figure 2:
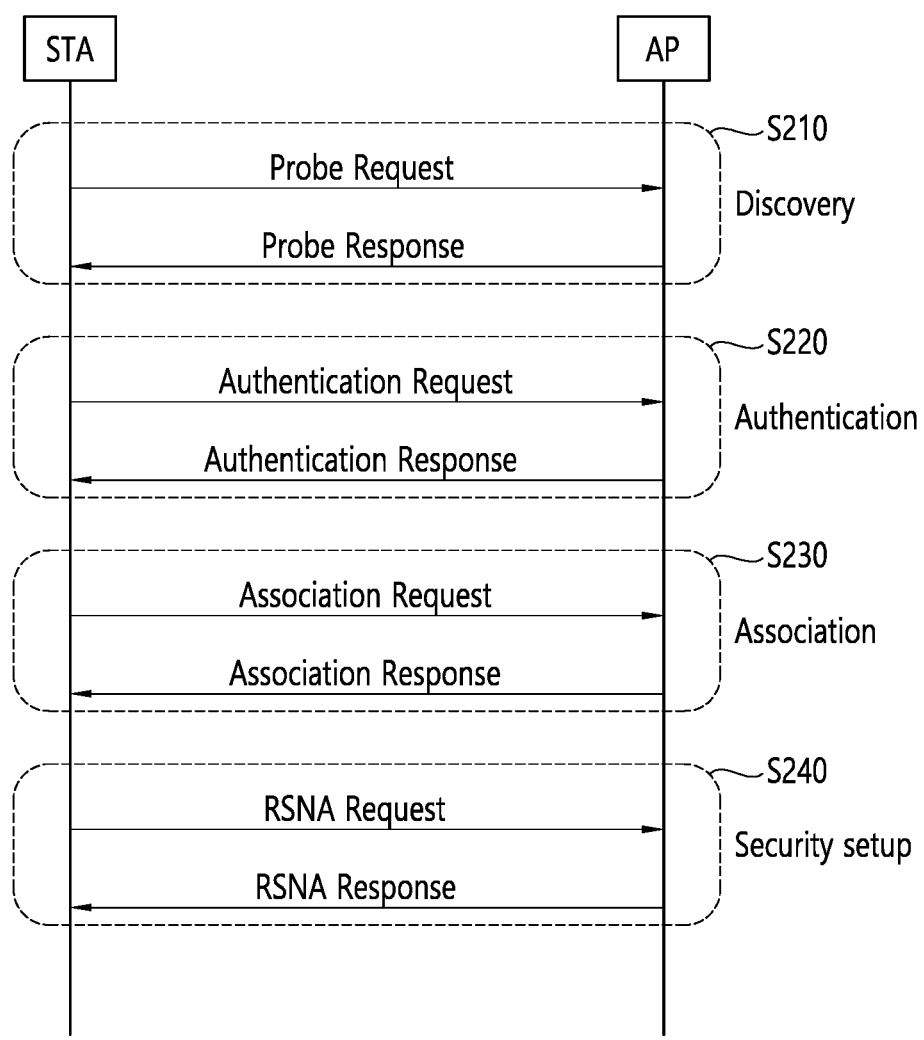
FIG. 2 is a view illustrating a general link setup process.

As used herein, a slash (/) or comma may indicate "and/or". For example, "A/B" may indicate "A and/or B", and therefore may mean "only A", "only B", or "A and B". Technical features that are separately described in one drawing may be implemented separately or may be implemented simultaneously.

As used herein, parentheses may indicate "for example". Specifically, "control information (EHT-Signal)" may mean that "EHT-Signal" is proposed as an example of "control information". Further, "control information (i.e., EHT-Signal)" may also mean that "EHT-Signal" is proposed as an example of "control information".

The following examples of the present specification may be applied to various wireless communication systems. For example, the following examples of the present specification may be applied to a wireless local area network (WLAN) system. For example, the present specification may be applied to IEEE 802.11a/g/n/ac or IEEE 802.11ax. The present specification may also be applied to a newly proposed EHT standard or IEEE 802.11be.

Hereinafter, technical features of a WLAN system to which the present specification is applicable are described in order to describe technical features of the present specification.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 illustrates a general link setup process.

In S210, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 2 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BS S-related information included in the received probe response frame, may move to the next channel (e.g., channel 2), and may perform scanning (e.g., transmits a probe request and receives a probe response via channel 2) by the same method.

Although not shown in FIG. 2, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S220. The authentication process may be referred to as a first authentication process to be clearly distinguished from the following security setup operation in S240. The authentication process in S220 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S230. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S240, the STA may perform a security setup process. The security setup process in S240 may include a process of setting up a private key through four-way handshaking, for example, through an extensible authentication protocol over LAN (EAPOL) frame.

Figure 3:
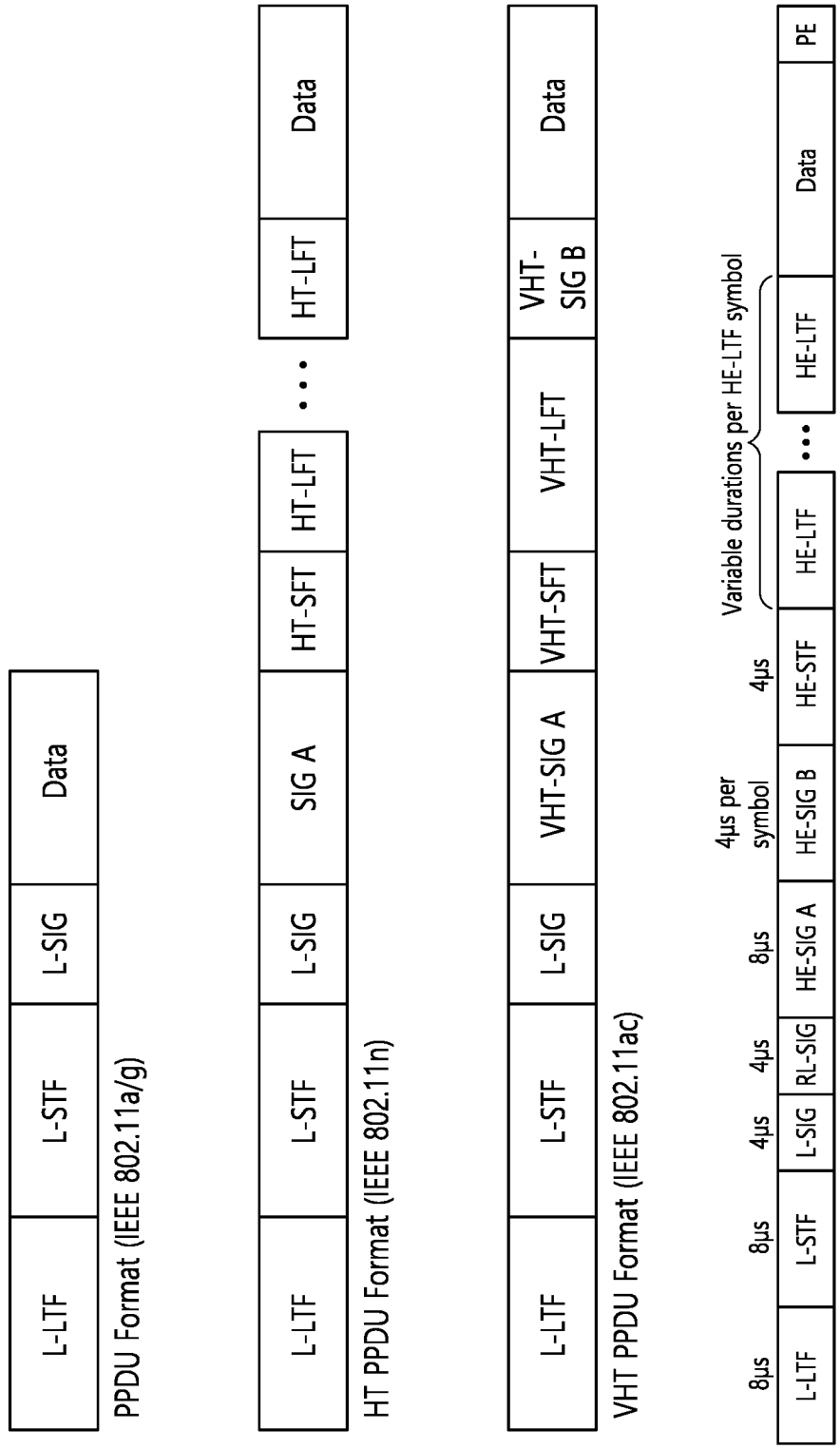
FIG. 3 is a view illustrating an example of a physical protocol data unit (PPDU) used in the IEEE standard.

FIG. 3 illustrates an example of a PPDU used in an IEEE standard.

As illustrated in FIG. 3, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU (MAC PDU/aggregated MAC PDU).

FIG. 3 also includes an example of an HE PPDU according to IEEE 802.11ax. The HE PPDU according to FIG. 3 is an illustrative PPDU for multiple users. An HE-SIG-B may be included only in a PPDU for multiple users, and an HE-SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 4:
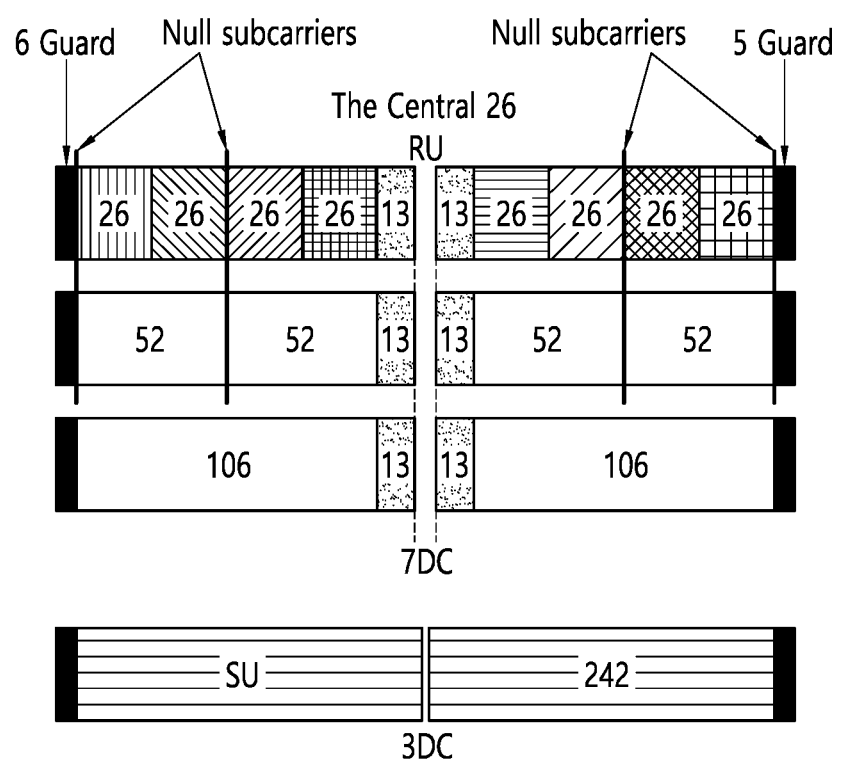
FIG. 4 is a view illustrating an arrangement of a resource unit (RU) used in a 20 MHz band.

FIG. 4 illustrates a layout of resource units (RUs) used in a band of 20 MHz.

As illustrated in FIG. 4, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 4, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 4 may be used not only for a multiple users (MUs) but also for a single user (SU), in which case one 242-unit may be used and three DC tones may be inserted as illustrated in the lowermost part of FIG. 4.

Although FIG. 4 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 5:
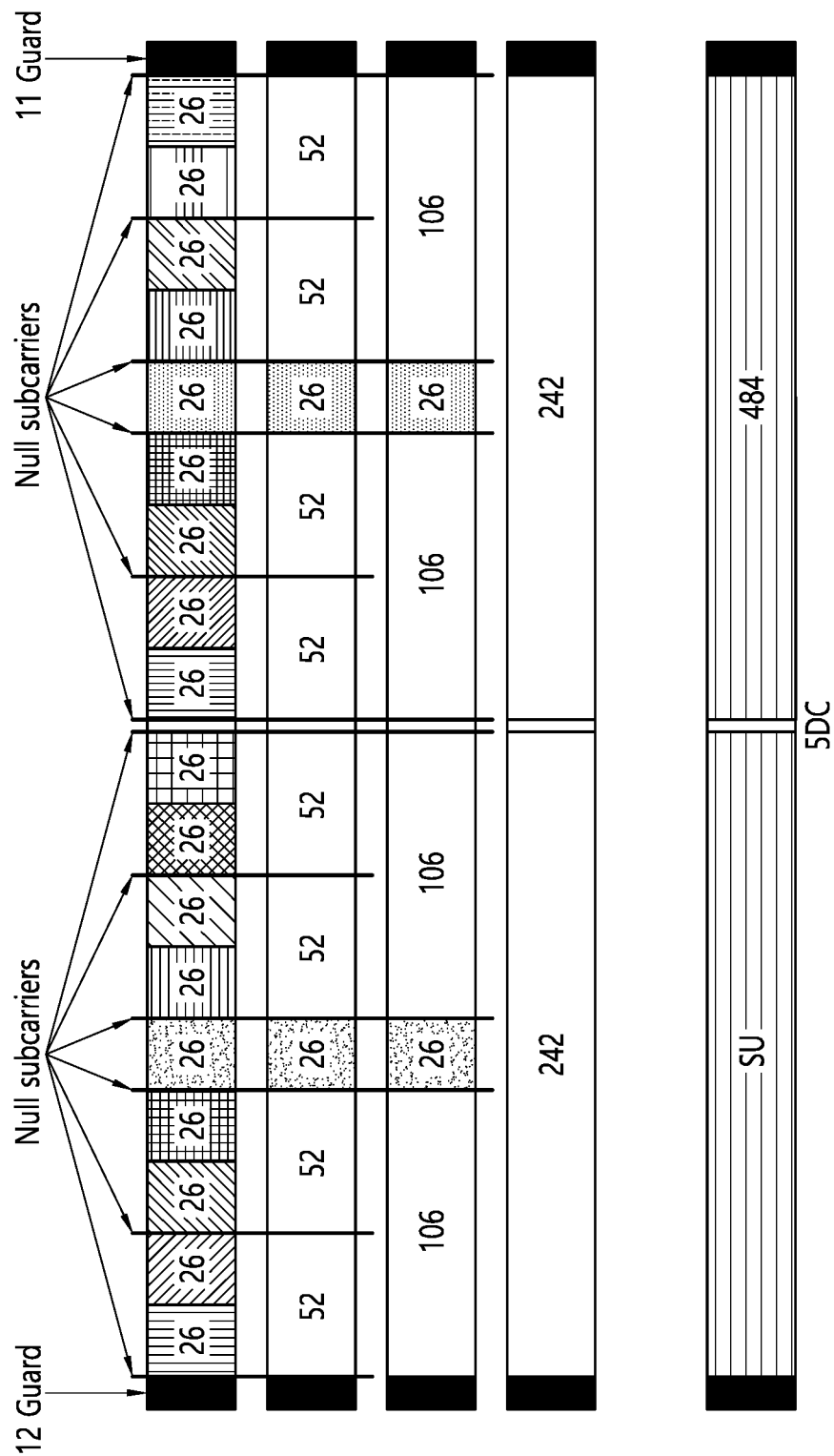
FIG. 5 is a view illustrating an arrangement of a resource unit (RU) used in a 40 MHz band.

FIG. 5 illustrates a layout of RUs used in a band of 40 MHz.

Similarly to FIG. 4 in which RUs having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 5, when the layout of the RUs is used for a single user, a 484-RU may be used. The specific number of RUs may be changed similarly to FIG. 4.

Figure 6:
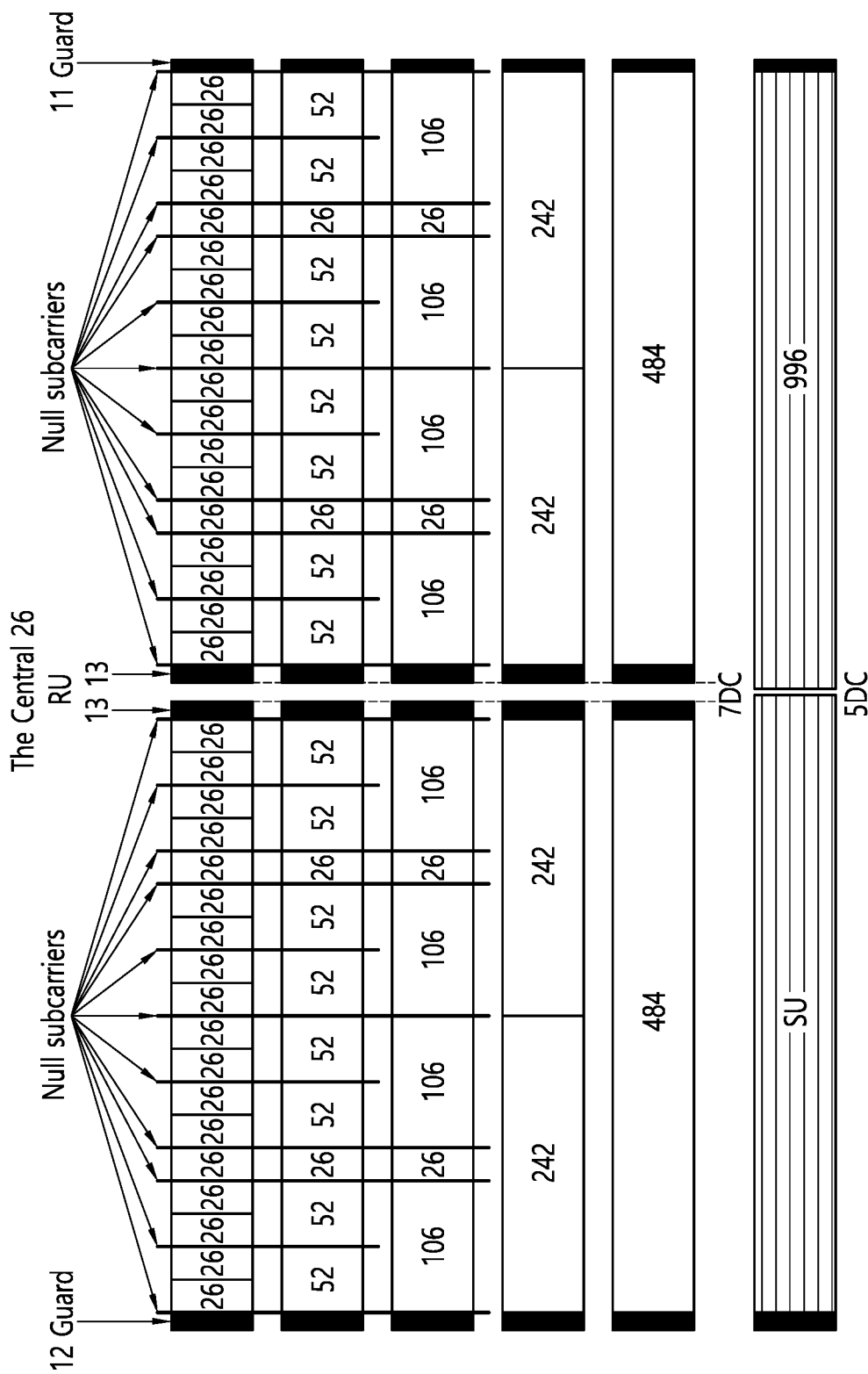
FIG. 6 is a view illustrating an arrangement of a resource unit (RU) used in an 80 MHz band.

FIG. 6 illustrates a layout of RUs used in a band of 80 MHz.

Similarly to FIG. 4 and FIG. 5 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 6, when the layout of the RUs is used for a single user, a 996-RU may be used, in which case five DC tones may be inserted.

The specific number of RUs may be changed similarly to FIG. 4 and FIG. 5.

Figure 7:
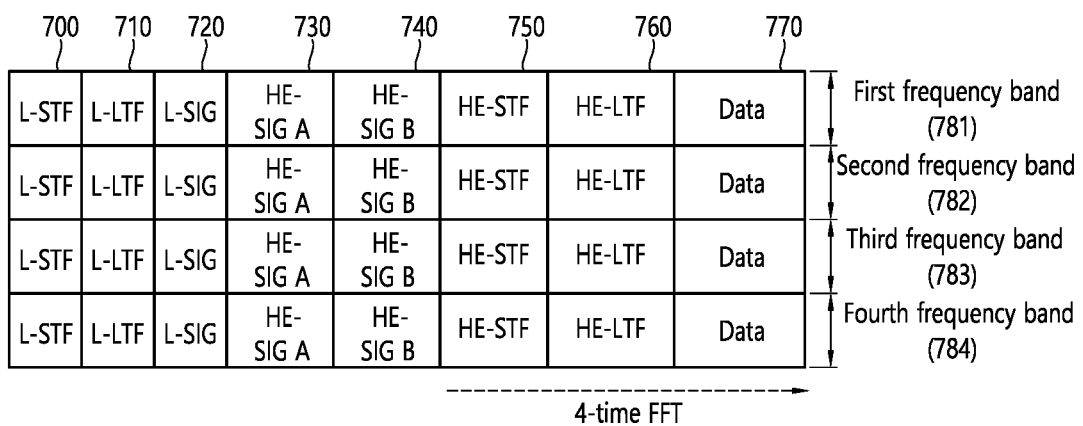
FIG. 7 is a view illustrating another example of an HE-PPDU.

FIG. 7 illustrates another example of an HE PPDU.

Technical characteristics of the HE PPDU illustrated in FIG. 7 may also be applied to an EHT PPDU to be newly proposed. For example, technical characteristics applied to an HE-SIG may also be applied to an EHT-SIG, and technical characteristics of an HE-STF/LTF may also be applied to an EHT-SFT/LTF.

An L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information about a data rate and a data length. Further, the L-SIG 720 may be repeatedly transmitted. That is, a format in which the L-SIG 720 is repeated (which may be referred to, for example, as an R-LSIG) may be configured.

An HE-SIG-A 730 may include control information common to a receiving STA.

Specifically, the HE-SIG-A 730 may include information about 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to an HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A specific field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Basically, an HE-SIG-A 750 or an HE-SIG-B 760 may include resource allocation information (or virtual resource allocation information) for at least one receiving STA.

An HE-STF 750 may be used for improving automatic gain control estimation in a multiple input multiple output (MIMO) environment or an OFDMA environment.

An HE-LTF 760 may be used for estimating a channel in the MIMO environment or the OFDMA environment.

The size of fast Fourier transform (FFT)/inverse fast Fourier transform (IFFT) applied to the HE-STF 750 and a field after the HE-STF 750 may be different from the size of FFT/IFFT applied to a field before the HE-STF 750. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field related to a legacy system, and the second field may include a field related to an HE system. In this case, the fast Fourier transform (FFT) size and the inverse fast Fourier transform (IFFT) size may be defined as a size which is N (N is a natural number, for example, N=1, 2, or 4) times larger than the FFT/IFFT size used in the legacy wireless LAN system. That is, the FFT/IFFT having the size may be applied, which is N(=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N(=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4(=12.8 μs). The length of the OFDM symbol may be a value acquired by adding the length of a guard interval (GI) to the IDFT/DFT length. The length of the GI may have various values, such as 0.4 μs, 0.8 μs, 1.6 μs, 2.4 μs, and 3.2 μs.

For convenience of description, FIG. 7 shows that a frequency band used for the first field and a frequency band used for the second field accurately correspond to each other, but both frequency bands may not completely correspond to each other in actual. For example, a primary band of the first field (L-STF, L-LTF, L-SIG, HE-SIG-A, and HE-SIG-B) corresponding to the first frequency band may be the same as a primary band of the second field (HE-STF, HE-LTF, and Data), but boundaries of the respective frequency bands may not correspond to each other. As illustrated in FIG. 4 to FIG. 6, since a plurality of null subcarriers, DC tones, guard tones, and the like are inserted when arranging RUs, it may be difficult to accurately adjust the boundaries.

A user, that is, a receiving STA, may receive the HE-SIG-A 730 and may be instructed to receive a downlink PPDU based on the HE-SIG-A 730. In this case, the STA may perform decoding based on the FFT size changed from the HE-STF 750 and the field after the HE-STF 750. On the contrary, when the STA may not be instructed to receive a downlink PPDU based on the HE-SIG-A 730, the STA may stop decoding and may configure a network allocation vector (NAV). A cyclic prefix (CP) of the HE-STF 750 may have a larger size than a CP of another field, and the STA may decode a downlink PPDU by changing the FFT size in a period of the CP.

Hereinafter, in an embodiment, data (or a frame) transmitted from an AP to an STA may be referred to as downlink data (or a downlink frame), and data (a frame) transmitted from an STA to an AP may be referred to as uplink data (an uplink frame). Further, transmission from an AP to an STA may be referred to as downlink transmission, and transmission from an STA to an AP may be referred to as uplink transmission.

Figure 8:
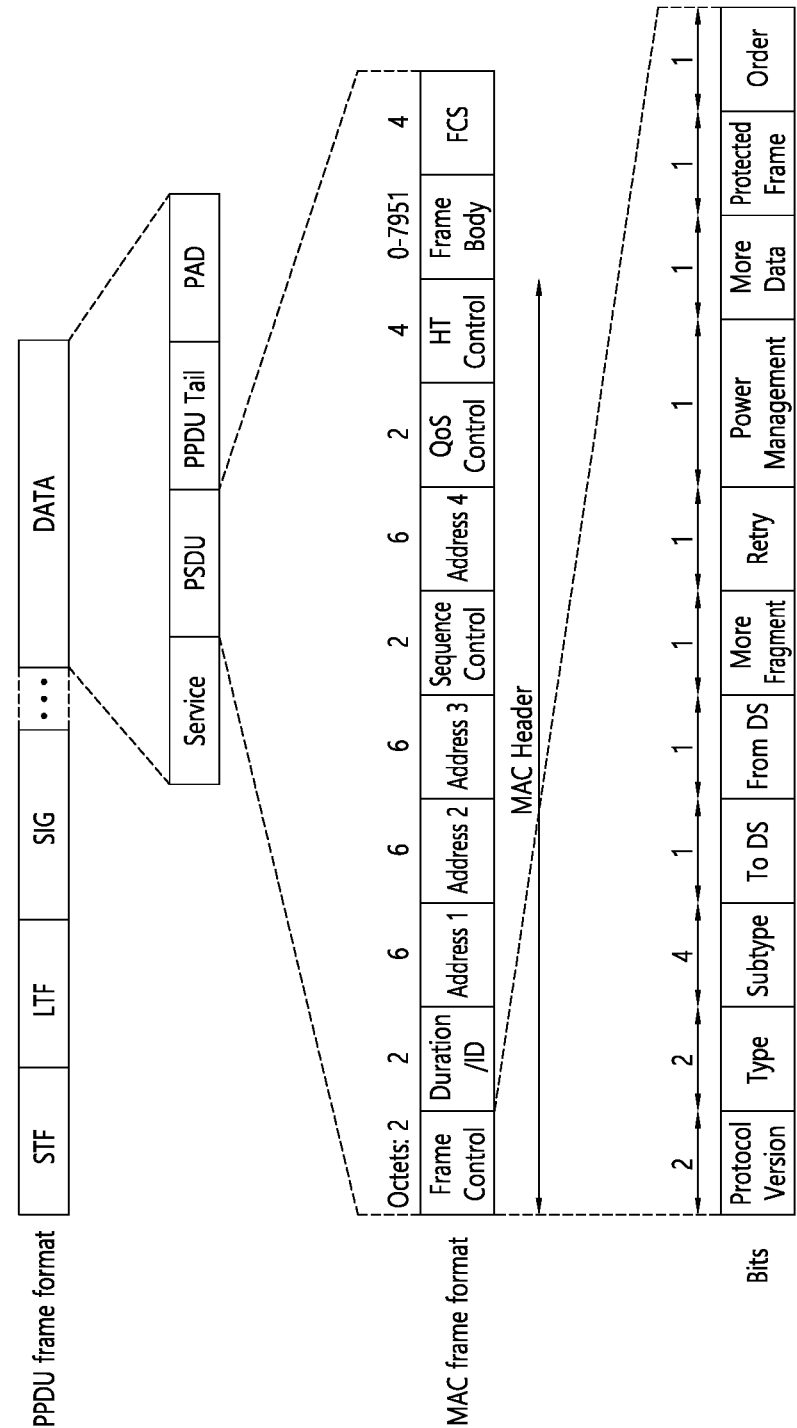
FIG. 8 is a view illustrating an example of a frame structure used in the IEEE 802.11 system.

FIG. 8 illustrates an example of a frame structure used in an IEEE 802.11 system. An STF, an LTF, and a SIG field illustrated in FIG. 8 may be the same as or equivalent to the (HT/VHT/EHT)-STF, the LTF, and the SIG field illustrated in FIG. 3 or FIG. 7. Further, a data field illustrated in FIG. 8 may be the same as or equivalent to a data field illustrated in FIG. 3 or FIG. 7.

The data field may include a service field, a physical layer service data unit (PSDU), and a PPDU tail bit, and may optionally include a padding bit. Some bits of the service field may be used for synchronization of a descrambler at a receiving end. The PSDU may correspond to a MAC protocol data unit (MPDU) defined in a MAC layer and may include data generated/used in a higher layer. The PPDU tail bit may be used to return an encoder to a zero state. The padding bit may be used to adjust the length of the data field in a specific unit.

The MPDU is defined according to various MAC frame formats, and a basic MAC frame includes a MAC header, a frame body, and a frame check sequence (FCS). The MAC frame may include an MPDU and may be transmitted/received through a PSDU of a data part of a PPDU frame format.

The MAC header includes a frame control field, a duration/ID field, an address field, or the like. The frame control field may include control information required for frame transmission/reception. The duration/ID field may be set to a time for transmitting a corresponding frame or the like.

The duration/ID field included in the MAC header may be set to a 16-bit length (e.g., B0~B15). Content included in the duration/ID field may vary depending on a frame type and a subtype, whether it is transmitted during a contention free period (CFP), QoS capability of a transmitting STA, or the like. In a control frame of which a subtype is PS-poll, the duration/ID field may include an AID of a transmitting STA (e.g., through 14 LSBs), and two MSBs may be set to 1. (ii) In frames transmitted by a point coordinator (PC) or a non-QoS STA during a CFP, the duration/ID field may be set to a fixed value (e.g., 32768). (iii) In other frames transmitted by the non-QoS STA or control frames transmitted by the QoS STA, the duration/ID field may include a duration value defined for each frame type. In a data frame or management frame transmitted by the QoS STA, the duration/ID field may include a duration value defined for each frame type. For example, if the duration/ID field is set to B15=0, the duration/ID field is used to indicate a TXOP duration, and B0 to B14 may be used to indicate an actual TXOP duration. The actual TXOP duration indicated by B0 to B14 may be any one of 0 to 32767, and a unit thereof may be a microsecond (us). However, if the duration/ID field indicates a fixed TXOP duration value (e.g., 32768), B15=1 and B0 to B14=0. If set to B14=1 and B15=1, the duration/ID field is used to indicate an AID, and B0 to B13 indicate one AID ranging from 1 to 2007.

A frame control field of the MAC header may include Protocol Version, Type, Subtype, To DS, From DS, More Fragment, Retry, Power Management, More Data, Protected Frame, and Order subfields.

Figure 9:
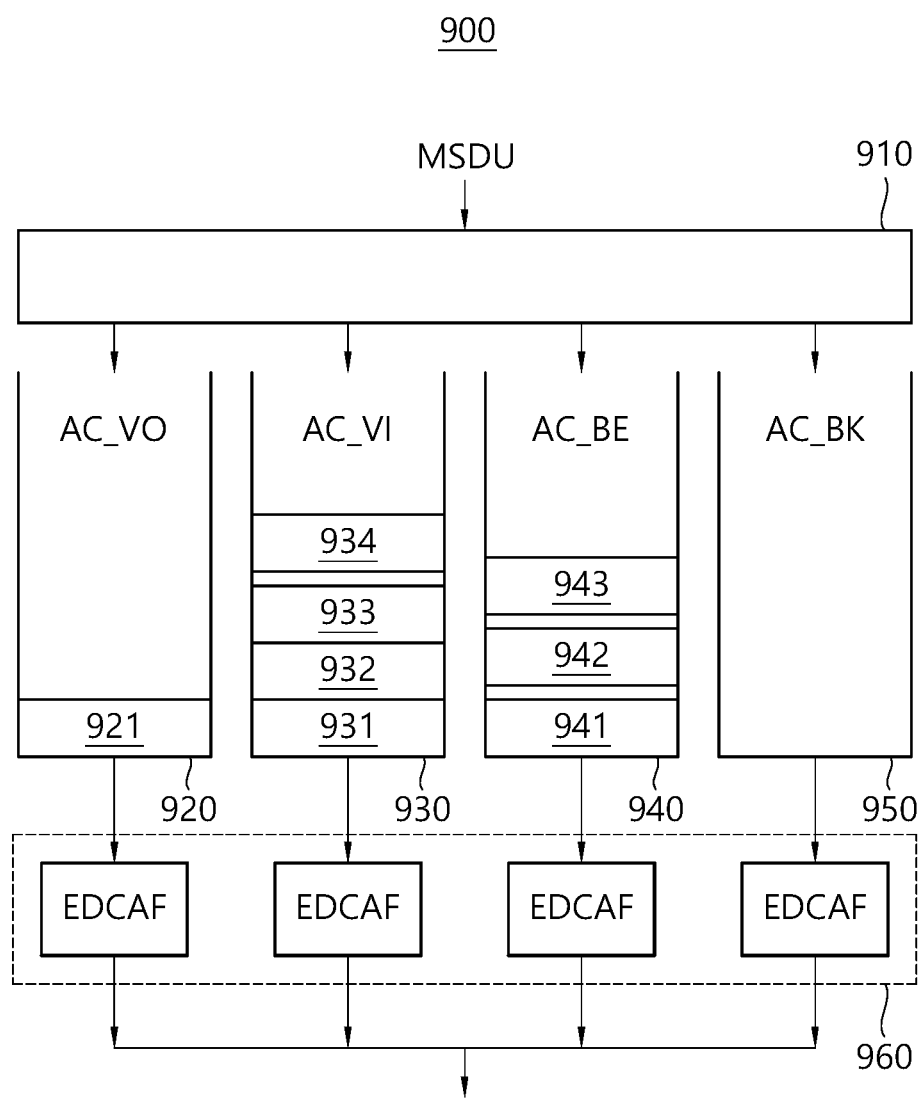
FIG. 9 illustrates a channel configuration in a 2.4 GHz band available in a WLAN system.

FIG. 9 is a diagram illustrating a channel access method based on EDCA. In a wireless LAN system, an STA may perform channel access based on a plurality of user priorities defined for enhanced distributed channel access (EDCA).

Specifically, for the transmission of a quality of service (QoS) data frame based on a plurality of user priorities, four access categories (ACs) (AC_BK (background), AC_BE (best effort), AC_VI (video), and AC_VO (voice) may be defined.

An STA may receive, from a higher layer, traffic data (e.g., MAC service data unit (MSDU)) having a preset user priority.

For example, in order to determine the transmission sequence of a MAC frame to be transmitted by an STA, a differential value may be set in a user priority for each traffic data. The user priority may be mapped based on each access category (AC) in which traffic data is buffered and Table 1 below.

TABLE 1

| Priority | User priority | Access category (AC) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

In the disclosure, the user priority may be understood as a traffic identifier (hereinafter "TID") indicating the characteristics of traffic data. Referring to Table 1, traffic data having the user priority (i.e., TID) of "1" or "2" may be buffered in a transmission queue 950 of an AC_BK type. Traffic data having the user priority (i.e., TID) of "0" or "3" may be buffered in a transmission queue 940 of an AC_BE type.

Traffic data having the user priority (i.e., TID) of "4" or "5" may be buffered in a transmission queue 930 of an AC_VI type. Traffic data having the user priority (i.e., TID) of "6" or "7" may be buffered in a transmission queue 920 of an AC_VO type.

Instead of a DCF interframe space (DIFS), CWmin, and CWmax that are parameters for a back-off operation/procedure based on the existing distributed coordination function (DCF), an arbitration interframe space (AIFS)[AC], CWmin [AC], CWmax[AC] and TXOP limit[AC] that are EDCA parameter sets may be used for a back-off operation/procedure of an STA performing EDCA.

A difference between transmission priorities of ACs may be implemented based on a differentiated EDCA parameter set. A default value of the EDCA parameter set (i.e., AIFS [AC], CWmin[AC], CWmax[AC], and TXOP limit[AC]) corresponding to each AC is illustratively shown in Table 2. Detailed values of Table 2 may be set differently from those listed below.

TABLE 2

| AC | CWmin[AC] | CWmax[AC] | AIFS[AC] | TXOP limit[AC] |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

The EDCA parameter set for each AC may be set as a default value or may be included in a beacon frame and transmitted from an access point (AP) to each STA. The smaller the values of the AIFS[AC] and the CWmin[AC], the higher the priorities. Accordingly, a more band can be used in a given traffic environment because channel access latency is reduced. The EDCA parameter set may include information on a channel access parameter (e.g., AIFS [AC], CWmin[AC], and CWmax[AC]) for each AC.

A back-off operation/procedure for EDCA may be performed based on an EDCA parameter set individually set in each of the four ACs included in each STA. Proper setting of an EDCA parameter value that defines a different channel access parameter for each AC can optimize network performance and also increase a transmission effect based on the priority of traffic.

Accordingly, in a wireless LAN system, an AP needs to perform an overall management and coordination function on the EDCA parameters in order to guarantee fair medium access for all STAs participating in a network.

Referring to FIG. 9, one STA (or AP) 900 may include a virtual mapper 910, the plurality of transmission queues 920~950 and a virtual collision processor 960. In FIG. 9, the virtual mapper 910 may function to map an MSDU, received from a logical link control (LLC) layer, onto a transmission queue corresponding to each AC based on Table 1.

In FIG. 9, each of the plurality of transmission queues 920~950 may play a role of an EDCA contention entity for wireless medium access within one STA (or AP).

Figure 10:
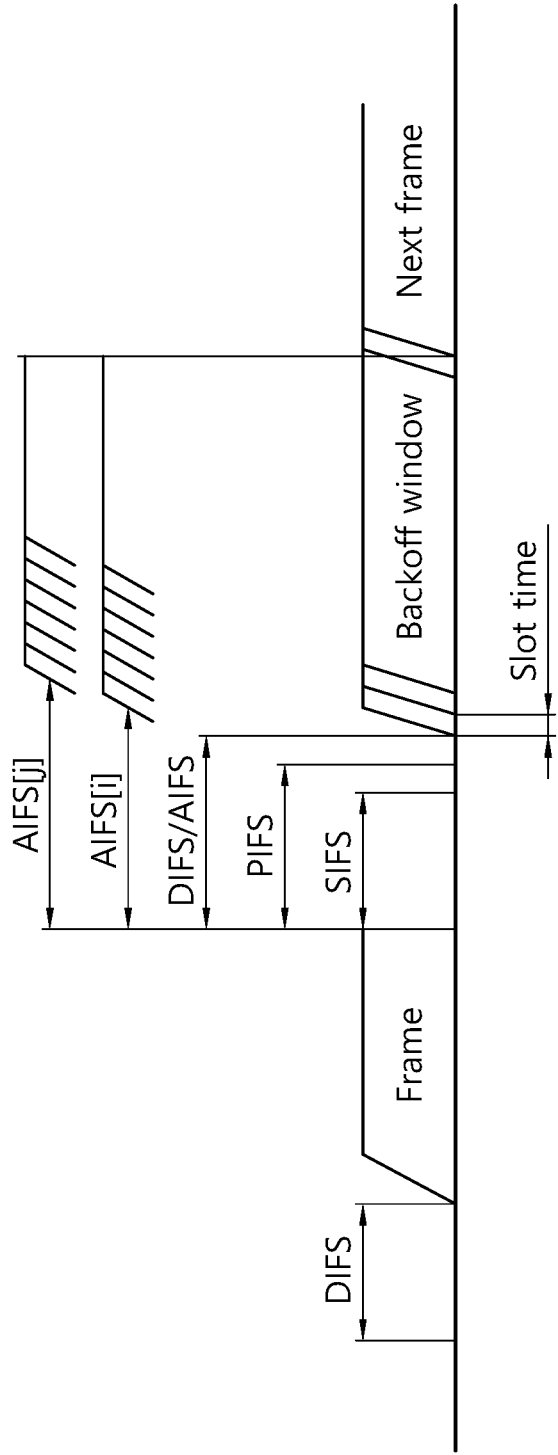
FIG. 10 illustrates a channel configuration in a 5 GHz band available in a WLAN system.

FIG. 10 is a concept view illustrating a back-off operation/procedure of EDCA.

A plurality of STAs may share a wireless medium based on a DCF, that is, a contention-based function. The DCF may use CSMA/CA in order to coordinate a collision between STAs.

In a channel access scheme using the DCF, if a medium is not used (i.e., channel is idle) during a DCF interframe space (DIFS), an STA may transmit an internally determined MPDU. The DIFS is a kind of time length used in the IEEE standard. The IEEE standard uses various time intervals, such as a slot time, a short inter-frame space (SIFS), a PCF inter-frame space (PIFS), a DIFS, and an arbitration inter-frame space (AIFS). A detailed value of each of the time intervals may be variously set. In general, a long length is set in order of the slot time, SIFS, PIFS, DIFS, and AIFS.

If it is determined that a wireless medium is used by another STA based on the carrier sensing mechanism of an STA (i.e., channel is busy), the STA may determine the size of a contention window (hereinafter "CW") and perform a back-off operation/procedure.

In order to perform a back-off operation/procedure, each STA may set a randomly selected back-off value in a back-off counter within a CW.

Each STA may perform a back-off operation/procedure for channel access by counting down a back-off window in a slot time unit. An STA that has selects a relatively shorter back-off window among a plurality of STAs may obtain a transmission opportunity (hereinafter "TXOP") capable of occupying a medium.

During a time interval for the TXOP, the remaining STAs may suspend countdown operations. The remaining STAs may wait until the time interval for the TXOP is ended. After the time interval for the TXOP is ended, the remaining STAs may resume the suspended countdown operations in order to occupy the wireless medium.

Based on a transmission method based on such a DCF, a collision phenomenon which may occur when a plurality of STAs transmits frames at the same time can be prevented. In this case, a channel access scheme using the DCF does not have a concept for a transmission priority (i.e., user priority). That is, when the DCF is used, quality of service (QoS) of traffic to be transmitted by an STA cannot be guaranteed.

In order to solve such a problem, in 802.11e, a hybrid coordination function (hereinafter "HCF"), that is, a new coordination function, has been defined. The newly defined HCF has better performance than channel access performance of the existing DCF. The HCF may use both HCF-controlled channel access (HCCA) of the polling scheme and contention-based enhanced distributed channel access (EDCA), that is, two types of channel access schemes, for QoS improvement purposes.

Referring to FIG. 10, it is assumed that an STA performs EDCA for the transmission of traffic data buffered in the STA. Referring to Table 1, a user priority set in each traffic data may be differentiated into eight stages.

Each STA may include output queues of the four types (AC_BK, AC_BE, AC_VI, and AC_VO) mapped onto the eight-stage user priorities of Table 1.

IFSs, such as the SIFS, the PIFS, and the DIFS, are additionally described below.

The IFS may be determined based on the attributes specified by the physical layer of an STA regardless of the bit rate of the STA. The remainder except the AIFS among the interframe spacings (IFSs) may fixedly use a value preset for each physical layer.

As illustrated in Table 2, the AIFS may be set as a value corresponding to the transmission queues of the four types mapped onto user priorities.

The SIFS has the shortest time gap among the aforementioned IFSs. Accordingly, the SIFS may be used when an STA occupying a wireless medium needs to maintain the occupancy of the medium without the interruption of another STA in an interval in which a frame exchange sequence is performed.

That is, a priority may be assigned when an on-going frame exchange sequence is completed using the smallest gap between transmissions within the frame exchange sequence. Furthermore, an STA accessing a wireless medium using the SIFS may immediately start transmission in an SIFS boundary without determining whether the medium is busy.

Duration of the SIFS for a specific physical (PHY) layer may be defined based on an aSIFSTime parameter. For example, an SIFS value is 11 μs in the physical layer (PHY) of the IEEE 802.11a, IEEE 802.11g, IEEE 802.11n and IEEE 802.11ac standards.

The PIFS may be used to provide an STA with a high priority next the SIFS. That is, the PIFS may be used to obtain a priority for accessing a wireless medium.

The DIFS may be used by an STA that transmits a data frame (MPDU) and a management frame (Mac protocol data unit (MPDU)) based on the DCF. After a received frame and a back-off time expires, if a medium is determined to be in the idle state through a carrier sense (CS) mechanism, the STA may transmit the frame.

Figure 11:
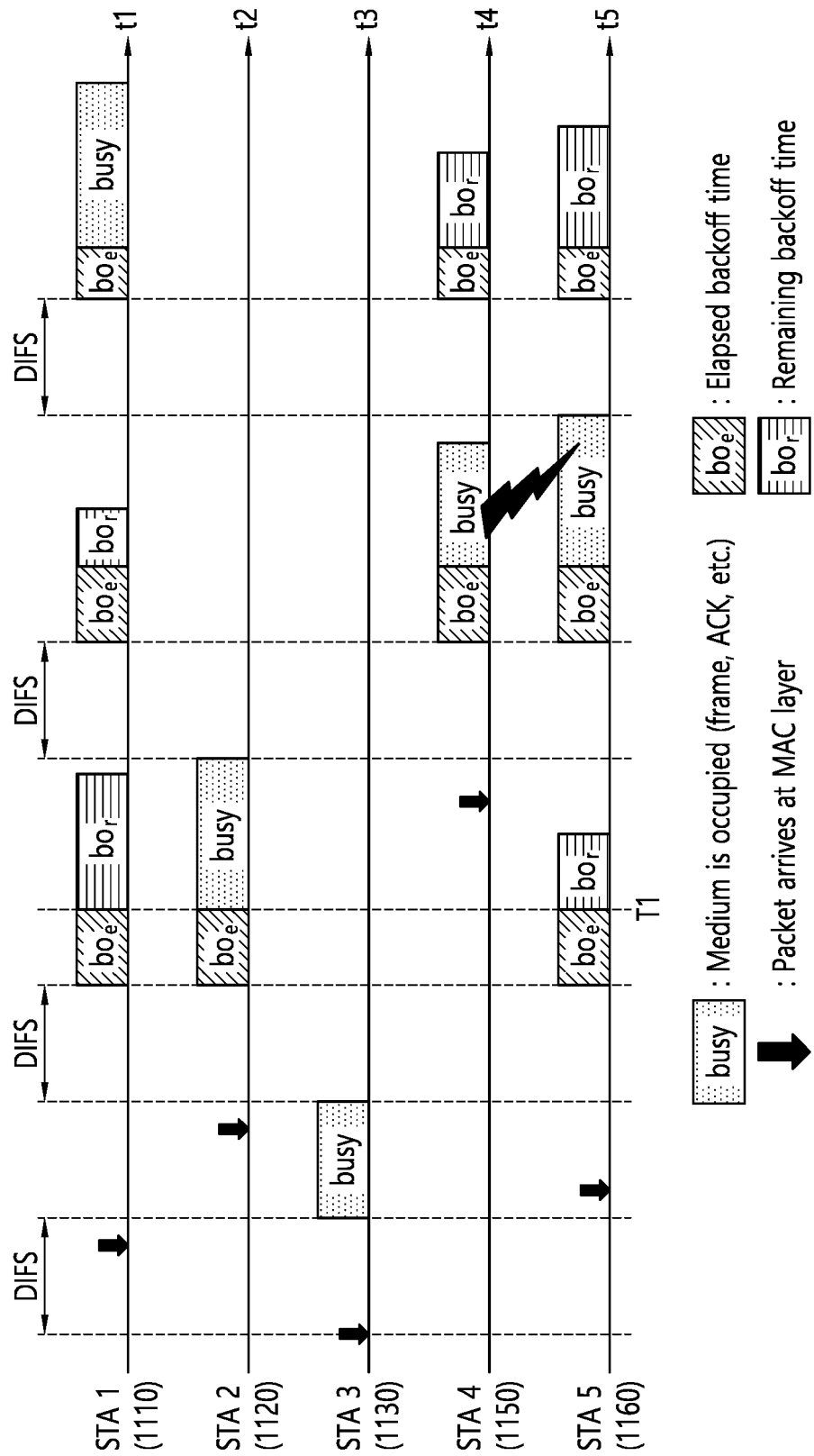
FIG. 11 is a view for describing a backoff operation.

FIG. 11 is a diagram describing a back-off operation.

Each of STAs 1110, 1120, 1130, 1140, and 1150 may select a back-off value for a back-off operation/procedure. Furthermore, each STA may attempt transmission after waiting as much as time (i.e., a back-off window) in which the selected back-off value is indicated in a slot time slot time unit. Furthermore, each STA may count down a back-off window in a slot time unit. A countdown operation for channel access to a wireless medium may be individually performed by each STA.

Time corresponding to the back-off window may be described as a random back-off time Tb[i]. In other words, each STA may individually set the back-off time Tb[i] in the back-off counter of each STA.

Specifically, the back-off time Tb[i] is a pseudo-random integer value, and may be computed based on Equation 1.

$$T_b[i]=\text{Random}(i)*\text{SlotTime} \quad \text{[Equation 1]}$$

In Equation 1, Random(i) is a function using a uniform distribution and generating a given integer between 0 and CW[i]. CW[i] may be understood as a contention window selected between a minimum contention window CWmin[i] and a maximum contention window CWmax[i]. The minimum contention window CWmin[i] and the maximum contention window CWmax[i] may correspond to CWmin[AC] and CWmax[AC], that is, default values in Table 2.

In initial channel access, an STA may select a given integer between 0 and CWmin[i] through Random(i) with CW[i] being fixed to CWmin[i]. In the present embodiment, the selected given integer may be described as a back-off value.

i may be understood as the user priority of traffic data. In Equation 1, i may be construed as corresponding to any one of AC_VO, AC_VI, AC_BE or AC_BK according to Table 1.

In Equation 1, the slot time SlotTime may be used to provide a sufficient time so that the preamble of a transmission STA is sufficiently detected by an adjacent STA. In Equation 1, the slot time SlotTime may be used to define the aforementioned PIFS and DIFS. For example, the slot time SlotTime may be 9 μs.

For example, when a user priority(i) is "7", an initial back-off time Tb[AC_VO] for the transmission queue of the AC_VO type may be time in which a back-off value selected between 0 and CWmin[AC_VO] is represented in unit of the slot time SlotTime.

If a collision between STAs occurs according to a back-off operation/procedure (or if an ACK frame for a transmitted frame is not received), an STA may compute an increased back-off time Tb[i]' based on Equation 2 below.

$$CW_{new}[i]=((CWold[i]+1)*PF)-1 \quad \text{[Equation 1]}$$

Referring to Equation 2, a new contention window $CW_{new}[i]$ may be computed based on a previous window $CW_{old}[i]$. In Equation 2, the PF value may be computed according to a procedure defined in the IEEE 802.11e standard. For example, in Equation 2, the PF value may be set to "2".

In the present embodiment, the increased back-off time Tb[i]' may be understood as time in which a given integer (i.e., a back-off value) selected between 0 and the new contention window $CW_{new}[i]$ is represented in a slot time unit.

The CWmin[i], CWmax[i], AIFS[i] and PF values described in FIG. 11 may be signaled from an AP through a QoS parameter set element, that is, a management frame. The CWmin[i], CWmax[i], AIFS[i] and PF values may be values preset by an AP and an STA.

Referring to FIG. 11, if the state of a specific medium changes from an occupy (or busy) state to an idle state, a plurality of STAs may attempt data (or frame) transmission. In this case, as a scheme for minimizing a collision between the STAs, each STA may select a back-off time back-off time Tb[i] in Equation 1, may wait for a slot time corresponding to the selected back-off time back-off, and may then attempt transmission.

When a back-off operation/procedure is initiated, each STA may individually count down the selected back-off counter time in a slot time unit. Each STA may continuously monitor the medium during the countdown.

If the state of the wireless medium is monitored as the occupancy state, the STA may suspend the countdown and may wait. If the state of the wireless medium is monitored as the idle state, the STA may resume the countdown.

Referring to FIG. 11, when a frame for the third STA 1130 reaches the MAC layer of the third STA 1130, the third STA 1130 may check whether the state of a medium is the idle state during a DIFS. Next, if the state of the medium is determined to be the idle state during the DIFS, the third STA 1130 may transmit the frame.

While the frame is transmitted by the third STA 1130, the remaining STAs may check the occupancy state of the medium and wait for the transmission interval of the frame. The frame may reach the MAC layer of each of the first STA 1110, the second STA 1120 and the fifth STA 1160. If the state of the medium is checked as the idle state, each STA may wait for the DIFS and then count down an individual back-off time selected by each STA.

FIG. 11 illustrates a case where the second STA 1120 has selected the smallest back-off time and the first STA 1110 has selected the greatest back-off time. FIG. 11 illustrates a case where at timing T1 at which frame transmission is started after a back-off operation/procedure for a back-off time selected by the second STA 1120 is terminated, the remaining back-off time of the fifth STA 1160 is shorter than the remaining back-off time of the first STA 1110.

When the medium is occupied by the second STA 1120, the first STA 1110 and the fifth STA 1160 may suspend the back-off operation/procedures and may wait. Next, when the medium occupancy of the second STA 1120 is ended (i.e., when the state of the medium becomes the idle state again), the first STA 1110 and the fifth STA 1160 may wait as much as the DIFS.

Next, the first STA 1110 and the fifth STA 1160 may resume the back-off operation/procedures based on the suspended remaining back-off time. In this case, since the remaining back-off time of the fifth STA 1160 is shorter than the remaining back-off time of the first STA 1110, the fifth STA 1160 may complete the back-off operation/procedure before the first STA 1110.

Meanwhile, referring to FIG. 11, when the medium is occupied by the second STA 1120, a frame for the fourth STA 1150 may reach the MAC layer of the fourth STA 1150. When the state of the medium becomes the idle state, the fourth STA 1150 may wait as much as the DIFS. Next, the fourth STA 1150 may count down a back-off time selected by the fourth STA 1150.

Referring to FIG. 11, the remaining back-off time of the fifth STA 1160 may coincide with the back-off time of the fourth STA 1150. In this case, a collision occurs between the fourth STA 1150 and the fifth STA 1160. When the collision between the STAs occurs, both the fourth STA 1150 and the fifth STA 1160 do not receive ACK and may fail in data transmission.

Accordingly, the fourth STA 1150 and the fifth STA 1160 may individually compute new contention windows CWnew [i] according to Equation 2. Next, the fourth STA 1150 and the fifth STA 1160 may individually perform countdown on the back-off times newly computed according to Equation 2.

Meanwhile, when the state of the medium is the occupancy state due to the transmission of the fourth STA 1150 and the fifth STA 1160, the first STA 1110 may wait. Next, when the state of the medium becomes the idle state, the first STA 1110 may wait as much as the DIFS and then resume back-off counting. When the remaining back-off time of the first STA 1110 elapses, the first STA 1110 may transmit the frame.

An STA (AP and/or non-AP STA) of the present disclosure can support multi-link communication. The STA supporting multi-link communication can simultaneously perform communication through a plurality of links. That is, STA supporting multi-link communication can perform communication through a plurality of links for a first time period and perform communication through only any one of the plurality of links for a second time period.

Multi-link communication may mean communication supporting a plurality of links, and a link may include a channel (e.g., 20/40/80/160/240/320 MHz channel) defined in a 2.4 GHz band, a 5 GHz band, a 6 GHz band, and/or a specific band which will be described below. Hereinafter, various bands and channels will be described.

Figure 12:
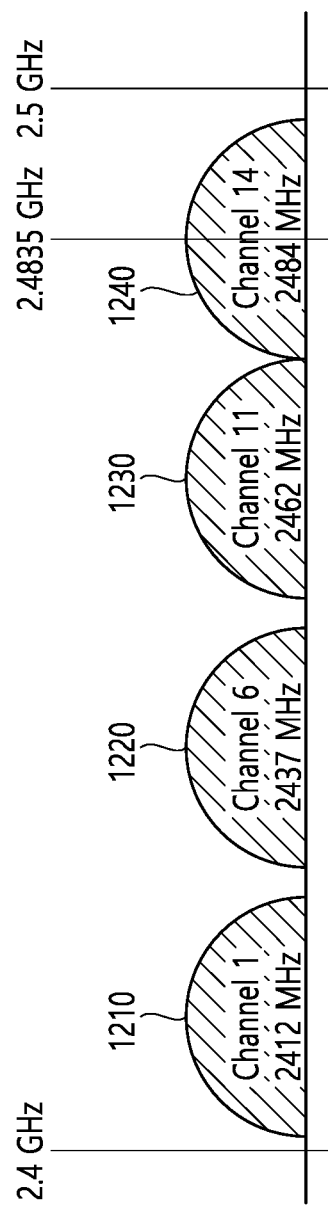
FIG. 12 illustrates an example of channels used/supported/defined in a 2.4 GHz band.

FIG. 12 illustrates an example of channels used/supported/defined in a 2.4 GHz band.

The 2.4 GHz band may be called other names such as a first band. Further, the 2.4 GHz band may mean a frequency domain in which channels having center frequencies close to 2.4 GHz (e.g., channels having center frequencies within 2.4 to 2.5 GHz) are used/supported/defined.

The 2.4 GHz band may include a plurality of 20 MHz channels. The 20 MHz channels in the 2.4 GHz band may have a plurality of channel indexes (e.g., index 1 to index 14). For example, the center frequency of a 20 MHz channel to which channel index 1 is allocated may be 2.412 GHz, the center frequency of a 20 MHz channel to which channel index 2 is allocated may be 2.417 GHz, and the center frequency of a 20 MHz channel to which channel index N is allocated may be (2.407+0.005*N) GHz. A channel index may be called other names such as a channel number. Specific numerical values of channel indexes and center frequencies may be changed.

FIG. 12 illustrates four channels in the 2.4 GHz band. Each of the illustrated first to fourth frequency domains 1210 to 1240 may include a single channel. For example, the first frequency domain 1210 may include channel #1 (20 MHz channel having index #1). Here, the center frequency of channel #1 may be set to 2412 MHz. The second frequency domain 1220 may include channel #6. Here, the center frequency of channel #6 may be set to 2437 MHz. The third frequency domain 1230 may include channel #11. Here, the center frequency of channel #11 may be set to 2462 MHz. The fourth frequency domain 1240 may include channel #14. Here, the center frequency of channel #14 may be set to 2484 MHz.

Figure 13:
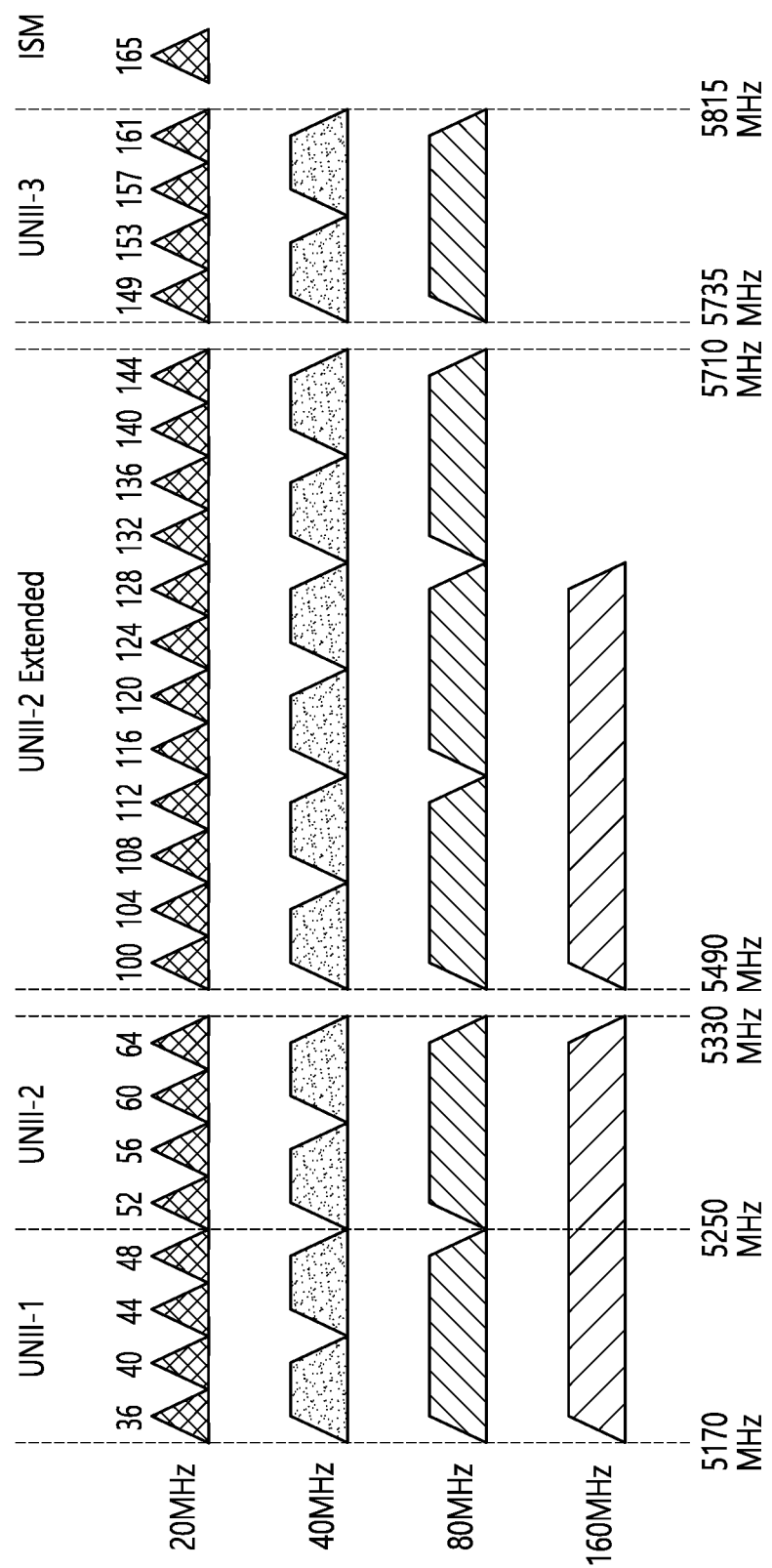
FIG. 13 illustrates an example of channels used/supported/defined in a 5 GHz band.

FIG. 13 illustrates an example of channels used/supported/defined in a 5 GHz band.

The 5 GHz band may be called other names such as a second band. The 5 GHz band may mean a frequency domain in which channels having center frequencies of 5 GHz or higher and less than 6 GHz (or less than 5.9 GHz) are used/supported/defined. Otherwise, the 5 GHz band may include a plurality of channels in a range of 4.5 GHz to 5.5 GHz. Specific numerical values illustrated in FIG. 13 may be changed.

A plurality of channels in the 5 GHz band includes UNII (Unlicensed National Information Infrastructure)-1, UNII-2, UNII-3, and ISM. UNII-1 may also be called UNII Low. UNII-2 may include frequency domains called UNII Mid and UNII-2Extended. UNII-3 may be called UNII-Upper.

A plurality of channels may be set in the 5 GHz band, and a bandwidth of each channel may be set to 20 MHz, 40 MHz, 80 MHz, or 160 MHz in various manners. For example, a frequency domain/range of 5170 MHz to 5330 MHz in UNII-1 and UNII-2 may be divided into eight 20 MHz channels. The frequency domain/range of 5170 MHz to 5330 MHz may be divided into four channels through a 40 MHz frequency domain. The frequency domain/range of 5170 MHz to 5330 MHz may be divided into two channels through an 80 MHz frequency domain. Alternatively, the frequency domain/range of 5170 MHz to 5330 MHz may be defined as a single channel through a 160 MHz frequency domain.

Figure 14:
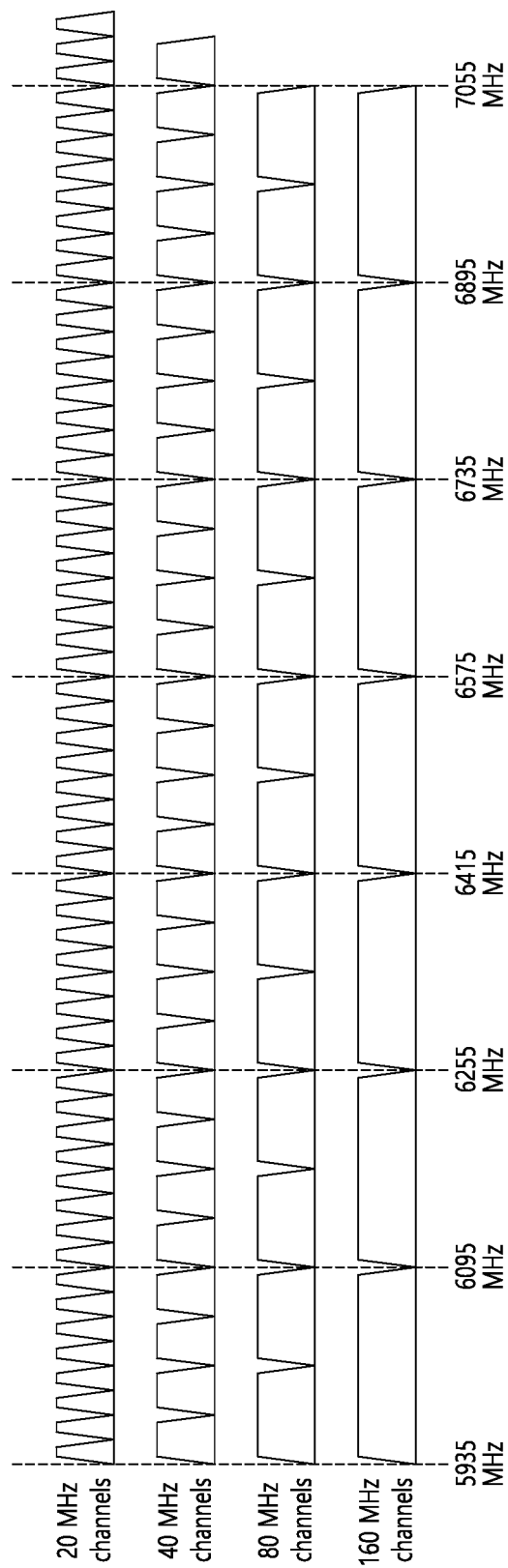
FIG. 14 illustrates an example of channels used/supported/defined in a 6 GHz band.

FIG. 14 illustrates an example of channels used/supported/defined in a 6 GHz band.

The 6 GHz band may be called other names such as a third band. The 6 GHz band may mean a frequency domain in which channels having center frequencies of 5.9 GHz or higher are used/supported/defined. Specific numerical values illustrated in FIG. 14 may be changed.

For example, a 20 MHz channel in FIG. 14 may be defined from 5.940 GHz. Specifically, the leftmost channel among 20 MHz channels of FIG. 14 may have index #1 (or channel index #1, channel number #1, or the like) and a center frequency of 5.945 GHz may be allocated thereto. That is, a center frequency of a channel with index #N may be determined as (5.940+0.005*N) GHz.

Accordingly, indexes (or channel numbers) of 20 MHz channels in FIG. 14 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, and 233. Further, indexes of 40 MHz channels in FIG. 20 may be 3, 11, 19, 27, 35, 43, 51, 59, 67, 75, 83, 91, 99, 107, 115, 123, 131, 139, 147, 155, 163, 171, 179, 187, 195, 203, 211, 219, and 227 according to the above-described (5.940+0.005*N) GHz rule.

Although 20, 40, 80, and 160 MHz channels are illustrated in the example of FIG. 14, 240 MHz channels or 320 MHz channels may be added.

Hereinafter, the concept of conventional channel bonding will be described.

For example, in an IEEE 802.11n system, two 20 MHz channels may be combined and thus 40 MHz channel bonding may be performed. In an IEEE 802.11ac system, 40/80/160 MHz channel bonding may be performed.

For example, an STA may perform channel bonding with respect to a primary 20 MHz channel (P20 channel) and a secondary 20 MHz channel (S20 channel). A backoff counter/counter may be used in a channel bonding process. A backoff count value may be selected as a random value and may decrease in a backoff interval. When a backoff count value becomes 0, the STA can attempt to access a channel, in general.

The STA performing channel bonding determines whether the S20 channel has been maintained in an idle state for a specific period (e.g., point coordination function interframe space (PIFS)) at a point in time at which a backoff count value for the P20 channel becomes 0 upon determining that the P20 channel is in an idle state for a backoff interval. If the S20 channel is in an idle state, the STA can perform bonding of the P20 channel and the S20 channel. That is, the STA can transmit a signal (PPDU) through a 40 MHz channel (i.e., 40 MHz bonded channel) including the P20 channel and the S20 channel.

Figure 15:
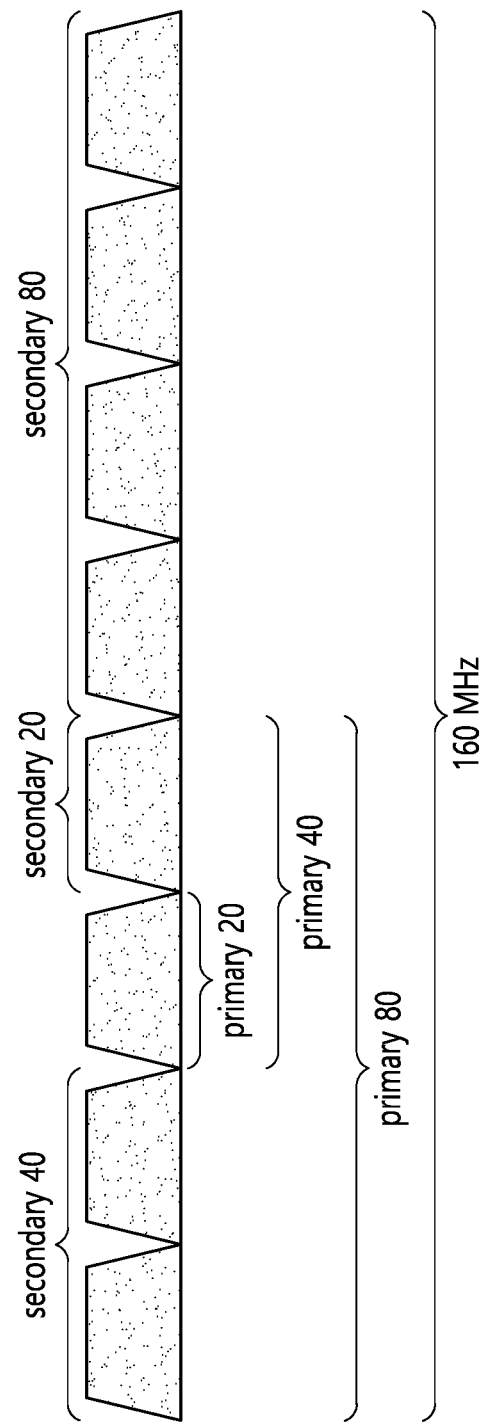
FIG. 15 illustrates an example of channel bonding.

FIG. 15 illustrates an example of channel bonding.

As illustrated in FIG. 15, a primary 20 MHz channel and a secondary 20 MHz channel may construct a 40 MHz channel (primary 40 MHz channel) through channel bonding. That is, the bonded 40 MHz channel can include the primary 20 MHz channel and the secondary 20 MHz channel.

Channel bonding can be performed when a channel consecutive to a primary channel is in an idle state. That is, a primary 20 MHz channel, a secondary 20 MHz channel, a secondary 40 MHz channel, and a secondary 80 MHz channel may be sequentially bonded. If the secondary 20 MHz channel is determined to be busy, channel bonding may not be performed even if all of other secondary channels are idle. Further, when it is determined that the secondary 20 MHz channel is idle and the secondary 40 MHz channel is busy, channel bonding may be performed only on the primary 20 MHz channel and the secondary 20 MHz channel.

Hereinafter, technical features with respect to multiple links and aggregation will be described.

An STA (AP and/or non-AP STA) of the present disclosure can support multi-link communication. That is, the STA can simultaneously transmit and receive signals through a first link and a second link on the basis of a multi-link. That is, the multi-link may refer to a technique by which an STA simultaneously transmits and receives signals through a plurality of links. For example, transmission of a signal through a certain link and reception of a signal through another link can also be included in multi-link communication. An STA supporting multi-link may use a plurality of links in a first time period and use only one link in a second time period.

Figure 16:
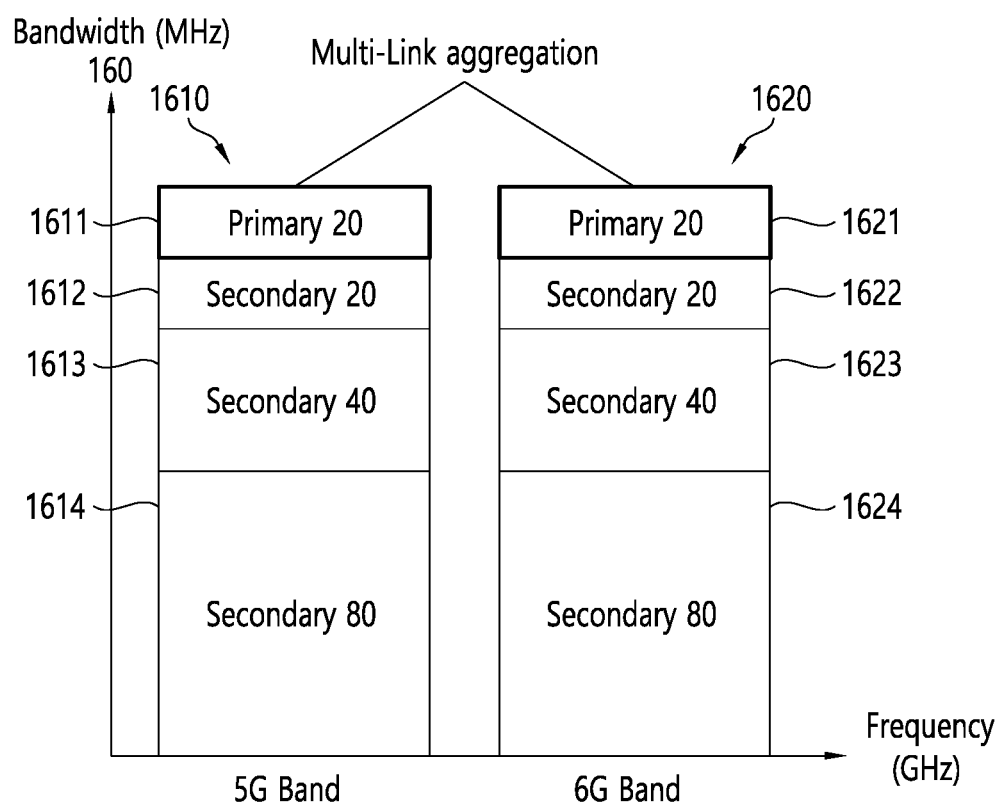
FIG. 16 is a view for describing technical features of links used for "a multi-link".

FIG. 16 is a view for describing technical features of links used for multi-link.

Links used for multi-link may have at least one of the following technical features. Features with respect to links described below are exemplary and additional technical features are applicable.

For example, links used for multi-link may be included in different bands. That is, when multi-link supporting first and second links is used, each of the first and second links is included in a 2.4 GHz band, a 5 GHz band, or a 6 GHz band, but the first and second links may be included in different bands.

Referring to FIG. 16, the first link 1610 and the second link 1620 may be used for multi-link. The first link 1610 of FIG. 16 may be included in a 5 GHz band, for example. The second link 1620 of FIG. 16 may be included in a 6 GHz band, for example.

Links used for multi-link may be included in the same band. For example, when multi-link supporting first/second/third links is used, all links may be included in the same band, or the first/second links may be included in a first band and the third link may be included in a second band.

Multi-link may be configured on the basis of different RF modules (e.g., IDFT/IFFT blocks). Additionally or alternatively, a plurality of links included in multi-link may be nonconsecutive in a frequency domain. That is, a frequency gap may be present between a frequency domain corresponding to the first link among a plurality of links and a frequency domain corresponding to a second link.

As illustrated in FIG. 16, the first link 1610 may include a plurality of channels 1611, 1612, 1613, and 1614. An STA can apply conventional channel bonding to the plurality of channels 1611, 1612, 1613, and 1614. That is, when the plurality of channels 1611, 1612, 1613, and 1614 are idle for a specific time period (e.g., for PIFS), the plurality of channels 1611, 1612, 1613, and 1614 can be configured as a single bonded channel, and the single bonded channel can operate as the single link 1610. Alternatively, some (e.g., 1611, 1612, and 1614) of the plurality of channels 1611, 1612, 1613, and 1614 may operate as the single link 1610 through preamble puncturing newly proposed in the IEEE 802.11ax standard. The aforementioned features can be equally applied to the second link 1620.

An upper limit may be set to the number (and/or a maximum bandwidth) of channels included in a single link used for multi-link. For example, a maximum of four channels can configure a single link as in the example of FIG. 16. Additionally or alternatively, a maximum bandwidth of a single link may be 160 MHz, 240 MHz, or 320 MHz. Additionally or alternatively, a single link may include only consecutive channels. The aforementioned specific numerical values may be changed.

A procedure for identifying/specifying/determining links used for multi-link relates to an aggregation (or channel aggregation) procedure. An STA may aggregate a plurality of links to perform multi-link communication. That is, the STA can perform 1) a first procedure for identifying/specifying/determining links aggregated for multi-link and 2) a second procedure for performing multi-link communication through identified/specified/determined links. The STA may separately or simultaneously perform the first procedure and the second procedure.

Hereinafter, technical features of the first procedure will be described.

An STA can transmit/receive information about a plurality of links configuring multi-link. For example, an AP can transmit identification information about bands for which multi-link capability is supported and/or identification information about channels for which multi-link capability is supported through a beacon, a probe response, an association response, and other control frames. For example, when the AP can aggregate some channels in a 5 GHz band and some channels in a 6 GHz band and then perform communication through the aggregated channels, the AP can transmit identification about the channels that can be aggregated to a user STA.

For example, the user STA can also transmit identification information about bands for which multi-link capability is supported and/or identification information about channels for which multi-link capability is supported through a probe request, an association response, and other control frames. For example, when the user STA can aggregate some channels in a 5 GHz band and some channels in a 6 GHz band and then perform communication through the aggregated channels, the user STA can transmit identification about the channels that can be aggregated to the AP.

Any one of a plurality of links configuring multi-link may operate as a primary link. The primary link can execute various functions. For example, an STA can perform aggregation of other links when a backoff value of the primary link is 0 (and/or when the primary link is idle for PIFS). Such information about the primary link may also be included in the beacon, the probe request/response, and association request/response.

The user-STA/AP can specify/determine/acquire bands and/or channels for multi-link communication through a negotiation procedure for exchanging information about their capability.

For example, the STA can specify/determine/acquire a first candidate band/channel that can be used for the first link, a second candidate band/channel that can be used for the second link, and a third candidate band/channel that can be used for the third link through the negotiation procedure.

Then, the STA can perform a procedure for identifying/specifying/determining links aggregated for multi-link. For example, the STA can aggregate at least two bands/channels on the basis of backoff counts and/or clear channel assessment (CCA) sensing results (busy/idle) of the first candidate band/channel, the second candidate band/channel, and the third candidate band/channel. For example, the STA can aggregate the second candidate band/channel that has been maintained in an idle state for a specific period (for PIFS) at a point in time at which the backoff count value of the first candidate band/channel is 0. That is, the STA can determine/specify the first candidate band/channel as the first link for multi-link, determine/specify the second candidate band/channel as the second link for multi-link, and perform multi-link communication through the first and second links.

Hereinafter, technical features of the second procedure will be described.

For example, when the STA determines that the first and second links are aggregated, the STA can perform multi-link communication through the first and second links. For example, the STA may transmit PPDUs having the same length through both the first and second links. Alternatively, the STA may receive a transmitting PPDU through the first link and receive a receiving PPDU through the second link for an overlap time period. The STA may perform communication through all the aggregated links in a specific time period and use only one link in other time periods.

Hereinafter, a multi-link communication method will be illustrated in the specification. A transmitting STA (or AP) may aggregate a plurality of links and configure multi-link using the aggregated links. Each link of the aggregated links may include a primary channel (e.g., primary 20 channel). The links constituting the aggregated links may include primary channels irrespective of the size of an applied bandwidth (e.g., a bandwidth equal to or greater than 20 MHz).

The transmitting STA may operate in a synchronous mode or an asynchronous mode when performing multi-link communication. In the synchronous mode, the transmitting STA can perform communication through a plurality of aggregated links at a designated point in time. In the asynchronous mode, the transmitting STA can perform communication through the plurality of aggregated links for the respective links. For example, the transmitting STA may perform communication through aggregated first and second links. In the synchronous mode, the transmitting STA may transmit or receive a packet (e.g., a PPDU or ACK) through the first link and the second link in the same time period. In the asynchronous mode, the transmitting STA may individually transmit or receive a packet through the first link and the second link. The transmitting STA may operate in the synchronous mode in a first time period and operate in the asynchronous mode in a second time period. Hereinafter, although the transmitting STA operates in the synchronous mode in description of the present disclosure for convenience of description, the transmitting STA may operate in the asynchronous mode.

Figure 17:
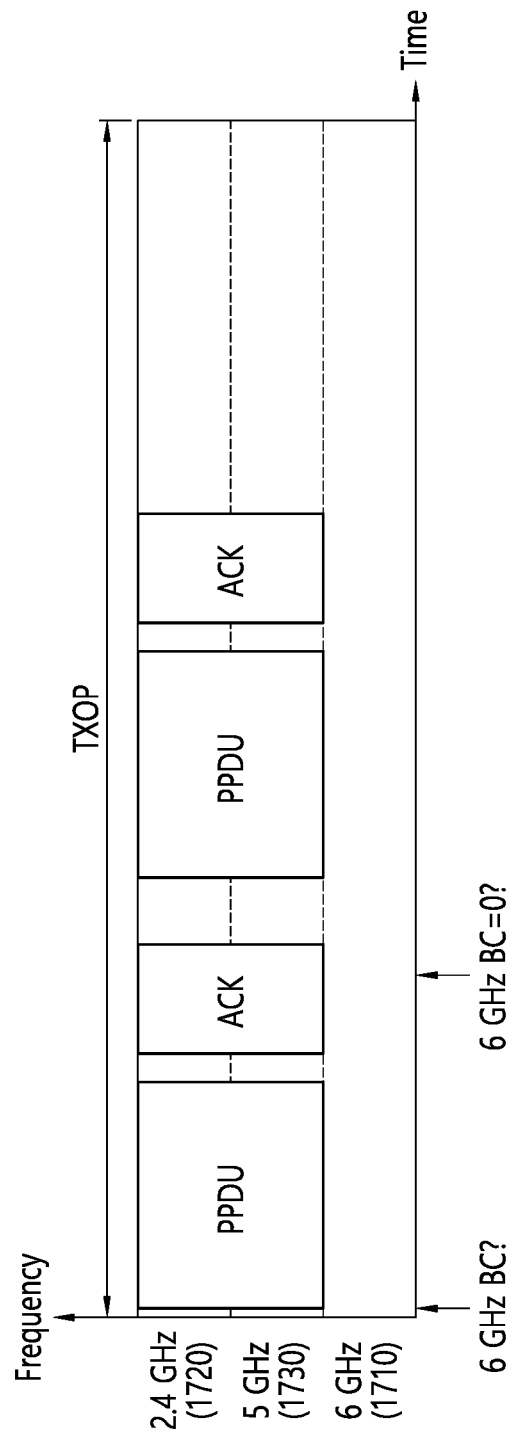
FIG. 17 illustrates an example of an operation of performing multi-link communication in a TXOP.

FIG. 17 illustrates an example of an operation of performing multi-link communication in a TXOP.

Referring to FIG. 17, a transmitting STA (or access point (AP)) can support a first frequency band/domain, a second frequency band/domain, and a third frequency band/domain. For example, the first frequency band/domain may include a 6 GHz band. The second frequency band/domain may include a 2.4 GHz band. A third frequency band/domain may include a 5 GHz band. The first frequency band/domain may include a link A 1710. The second frequency band/domain may include a link B 1720. The third frequency band/domain may include a link C 1730. The transmitting STA can identify whether any one channel (e.g., a primary channel or a primary 20 MHz channel) of the link A 1710, any one channel (e.g., a primary channel or a primary 20 MHz channel) of the link B 1720, and/or any one channel (e.g., a primary channel or a primary 20 MHz channel) of the link C 1730 are idle. For example, when the primary channel of the link B 1720 and the primary channel of the link C 1730 are idle, the transmitting STA can aggregate the link B 1720 and the link C 1730. When the link B 1720 and the link C 1730 are aggregated by the transmitting STA, the link B 1720 and the link C 1730 can operate as a single link. Accordingly, a plurality of links (e.g., the link B 1720 and the link C 1730) aggregated by the transmitting STA may be represented as a single link in an example of the present disclosure.

The transmitting STA may acquire a transmission opportunity (TXOP). The TXOP may include a time period for transmitting/receiving at least one packet. The transmitting STA may transmit or receive packets in the TXOP through the aggregated link B 1720 and link C 1730. The transmitting STA may acquire (or check) a BC value for the link A 1710 in the first frequency band/domain (or a BC value for the primary channel of the link A 1710). For example, the transmitting STA can confirm that the BC value for the link A 1710 is not 0 in the TXOP. Here, the transmitting STA may additionally aggregate the link A 1710 for the link B 1720 and the link C 1730 through various methods. Hereinafter, a method of adjusting a BC value for a link that is not aggregated in a TXOP and a general operation process of a transmitting STA with respect to the method will be described.

The present disclosure proposes a method of adjusting a BC value for a link (e.g., the link A 1710), through which communication through multi-link aggregation is not performed, depending on a CCA result in a TXOP. A transmitting STA may apply method A and method B-1 to method B-4 in order to adjust a BC value for a link, through which communication through multi-link aggregation is not performed, in a TXOP. For convenience of description, it can be assumed that the transmitting STA adjusts a BC value for the second link (e.g., link A 1710 of FIG. 17) while transmitting a packet through the first link (e.g., aggregated link B 1720 and link C 1730 of FIG. 17) in a TXOP set for the first link. The first link may include any one channel (e.g., 20/40/80/160/240/320 MHz channel) in a first band (e.g., 2.4 GHz, 5 GHz, or 6 GHz). The second link may include any one channel (e.g., 20/40/80/160/240/320 MHz channel) in a second band (e.g., 2.4 GHz, 5 GHz, or 6 GHz). Hereinafter, a BC value for any one channel (e.g., primary channel or primary 20 MHz channel) of the first link may be represented as a BC value for the first link for convenience of description. A BC value for any one channel (e.g., primary channel or primary 20 MHz channel) of the second link may be represented as a BC value for the second link. Hereinafter, a primary channel of a specific link may mean a primary 20 MHz channel, for example.

Method A: a method in which the transmitting STA maintains the BC value for the second link irrespective of a CCA result until transmission of the first link is completed (or until the TXOP ends).

The transmitting STA can maintain the BC value for the second link for the TXOP irrespective of whether the primary channel of the second link is idle. Specifically, the transmitting STA may acquire the BC value for the second link at the time of acquisition of the TXOP and/or in the TXOP. The transmitting STA may maintain the acquired BC value for the TXOP. Here, the transmitting STA may transmit a packet (e.g., PPDU) through the first link for the TXOP. Here, the second link may not be used for a transmission time and a backoff delay of the first link.

Method B: a method in which the transmitting STA adjusts a BC value depending on a CCA result according to a BC decrement rule applied thereto.

The transmitting STA may adjust a BC value using method B-1 to method B-4 below according to the BC value for the second link in a TXOP.

Method B-1: a method of reselecting, by the transmitting STA, a BC value when the BC value becomes a first value (e.g., {0}).

The transmitting STA may select a new BC value when the BC value for the second link becomes the first value in the TXOP. The transmitting STA may re-execute a backoff procedure after the TXOP for the first link ends. The transmitting STA may set (or acquire) a TXOP for the second link after the backoff procedure. The transmitting STA may transmit a packet through the second link in the set TXOP for the second link.

Method B-2: a method of, by the transmitting STA, making the second link wait (or deferring the second link) until transmission of the first link is completed (or until the TXOP ends) when the BC value has become the first value (e.g., {0}).

The transmitting STA may make the second link wait until packet transmission through the first link is completed when the BC value for the second link has become the first value. Thereafter, the transmitting STA may transmit a packet through at least one of the first link and the second link after the TXOP ends.

Method B-3: a method of, by the transmitting STA, receiving ACK through the first link in the TXOP set for the first link when the BC value becomes the first value (e.g., {0}) and aggregating the first link and the second link to extend a transmission link when the primary channel of the second link is idle for a designated time period.

The transmitting STA may determine whether the BC value for the second link is the first value in the TXOP. The transmitting STA may confirm that the BC value for the second link is the first value in the TXOP. The transmitting STA may make the second link wait upon confirming that the BC value for the second link is the first value. The transmitting STA may receive ACK after a point in time at which the BC value for the second link has become the first value. The transmitting STA may determine whether the primary channel of the second link is idle for a designated time period after the ACK is received. The designated time period may include, for example, PIFS, AIFS, one slot, or the like. The transmitting STA may additionally aggregate the second link into the first link when the primary channel of the second link is idle for the designated time period. The transmitting STA may transmit a packet in the TXOP through the first link and/or the second link after additional aggregation of the second link.

Method B-4: a method of additionally aggregating the second link to extend a transmission link even if the BC value is not the first value (e.g., {0}) when the primary channel of the second link is idle for a designated time period after reception of ACK in a TXOP.

The transmitting STA may check the BC value for the second link in a TXOP. The transmitting STA may receive ACK through the first link in the TXOP irrespective of the BC value for the second link. The transmitting STA may determine whether the primary channel of the second link is idle for a designated time period after reception of the ACK. The designated time period may include, for example, PIFS, AIFS, one slot, or the like. The transmitting STA may additionally aggregate the second link into the first link when the primary channel of the second link is idle for the designated time period. The transmitting STA may transmit a packet in the TXOP through the first link and/or the second link after additional aggregation of the second link.

The transmitting STA can increase a link utilization rate using an additional link (e.g., the second link) and transmit a packet (or data) before a TXOP ends through method B-3 and method B-4. The transmitting STA can change a PHY indication including information about a bandwidth and a link (or band) in the aforementioned packet. In addition, the transmitting STA may change a MAC indication including information about configuration of the remaining TXOP in a duration/ID field for a NAV for a third party device of an additional link (e.g., the second link). According to method B-4, a link utilization rate can be further improved because the second link is additionally aggregated irrespective of the BC value. The transmitting STA may reset the BC value or maintain the BC value after transmission ends (or the TXOP ends) through method B-4. FIGS. 8 to 21 illustrate specific operations of the transmitting STA with respect to a link, which is not aggregated at the time of acquisition of a TXOP, in a TXOP.

Figure 18:
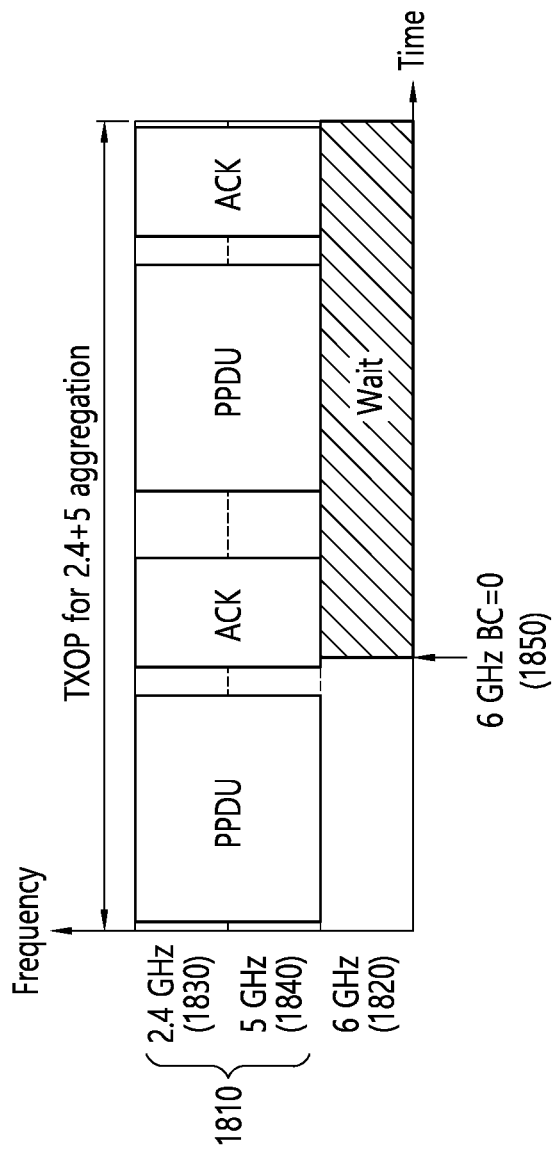
FIG. 18 illustrates another example of an operation of performing multi-link communication in a TXOP.

FIG. 18 illustrates another example of an operation of performing multi-link communication in a TXOP.

FIG. 18 is a view for describing an embodiment to which the aforementioned method B-2 is applied. Referring to FIG. 18, a first link 1810 may include aggregated third and fourth links 1830 and 1840. The transmitting STA may include an STA supporting a second link 1820, the third link 1830 and/or the fourth link 1840. For example, the second link 1820 may include at least one of the channels in a 6 GHz band. The third link 1830 may include at least one of the channels in a 2.4 GHz band. The fourth link 1840 may include at least one of the channels in a 5 GHz band.

The transmitting STA may specify at least one link to be aggregated from among the second link 1820, the third link 1830, and the fourth link 1840 supported thereby. Specifically, the transmitting STA may determine whether the second link 1820, the third link 1830, or the fourth link 1840 is idle through the CCA technique. For example, the transmitting STA may determine that the second link is busy and the third link 1830 and the fourth link 1840 are idle. The transmitting STA may aggregate the third link 1830 and the fourth link 1840 in an idle state.

According to an embodiment, the transmitting STA may determine whether the second link 1820, the third link 1830, or the fourth link 1840 is idle based on a BC value for the second link 1820, the third link 1830, or the fourth link 1840 and the CCA technique. For example, the transmitting STA may determine that the second link is busy and the third link 1830 and the fourth link 1840 are idle based on the CCA technique. Additionally, the transmitting STA may confirm that the BC value for the second link 1820 is not the first value (e.g., {0}). The transmitting STA may confirm that the BC values of the third link 1830 and the fourth link 1840 are the first value. The transmitting STA may aggregate the third link 1830 and the fourth link 1840 having a BC value corresponding to the first value and being in an idle state. The transmitting STA may transmit a packet through the aggregated third and fourth links 1830 and 1840. That is, the transmitting STA can transmit a packet through the first link 1810.

The transmitting STA may set a TXOP for the first link 1810. The transmitting STA may transmit or receive a packet (e.g., a PPDU or ACK) in the TXOP.

The transmitting STA may acquire (or check) a BC value for the second link 1820 in the TXOP set for the first link 1810. When the BC value for the second link 1820 is not the first value (e.g., {0}), the transmitting STA may check a point in time 1850 at which the BC value for the second link 1820 becomes the first value. The transmitting STA may make the second link 1820 wait (or defer the second link 1820) until the TXOP ends. The transmitting STA may maintain the BC value for the second link 1820 as the first value for the TXOP.

Figure 19:
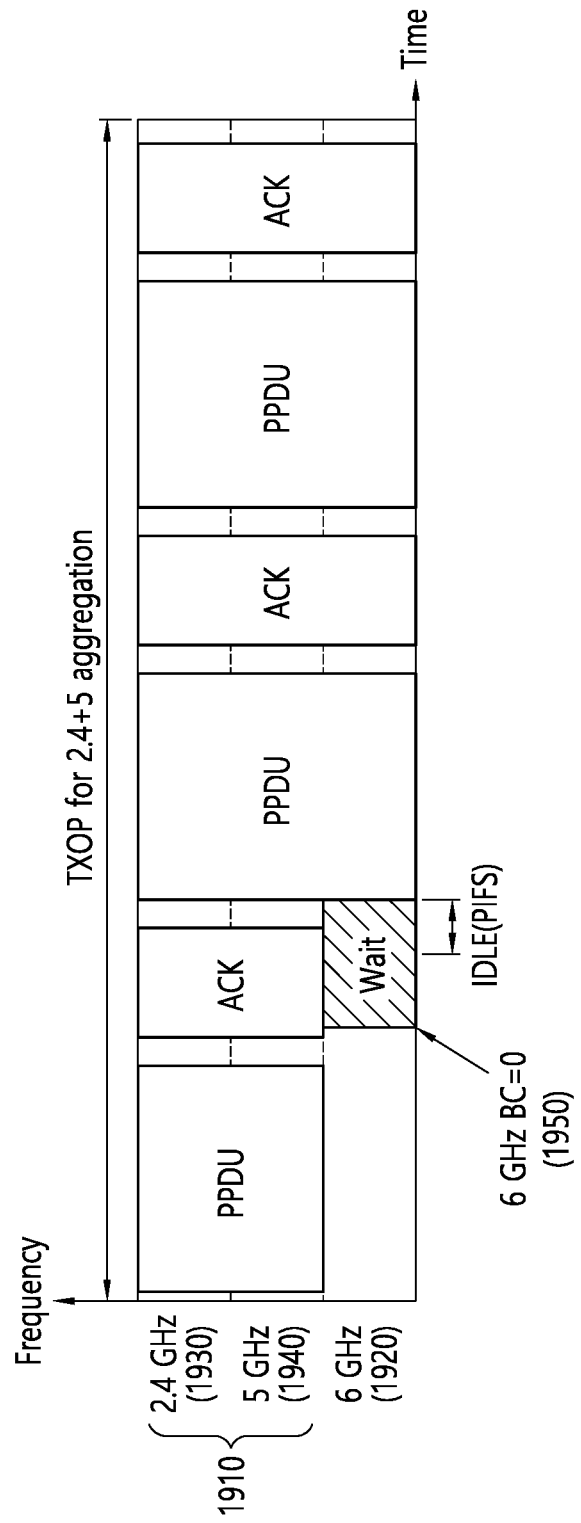
FIG. 19 illustrates another example of an operation of performing multi-link communication in a TXOP.

FIG. 19 illustrates another example of an operation of performing multi-link communication in a TXOP.

FIG. 19 is a view for describing an embodiment to which the aforementioned method B-3 is applied. Referring to FIG. 19, the transmitting STA may set a TXOP for a first link 1910. The first link 1910 may include aggregated third and fourth links 1930 and 1940. For example, the second link 1920 may include at least one of the channels in a 6 GHz band. The third link 1930 may include at least one of the channels in a 2.4 GHz band. The fourth link 1940 may include at least one of the channels in a 5 GHz band. The transmitting STA may confirm that the BC value of the second link 1920 is the first value (e.g., {0}) in the TXOP set for the first link.

The transmitting STA may make the second link 1920 wait for packet transmission in order to aggregate the second link 1920 into the first link 1910. The transmitting STA may receive ACK in the first link 1910. The transmitting STA may determine whether the second link 1920 is idle in a designated time period. The designated time period may include, for example, PIFS, AIFS, or one slot. For example, the transmitting STA may determine whether a primary channel of the second link 1920 is idle through CCA. The transmitting STA may aggregate the first link 1910 and the second link 1920 when it transmits a packet (e.g., a PPDU) after reception of ACK when the primary channel of the second link 1920 is idle. The transmitting STA may transmit the packet through the aggregated first and second links 1910 and 1920.

The transmitting STA may change an indication related to a changed physical layer in the packet transmitted after reception of ACK. The transmitting STA may include information about the remaining TXOP in the MAC duration/ID field of the packet and transmit the packet. Receiving STAs may receive the packet. Third party devices supporting a band including the second link 1920 from among the receiving STAs may set a network allocation vector (NAV) in response to the packet.

Figure 20:
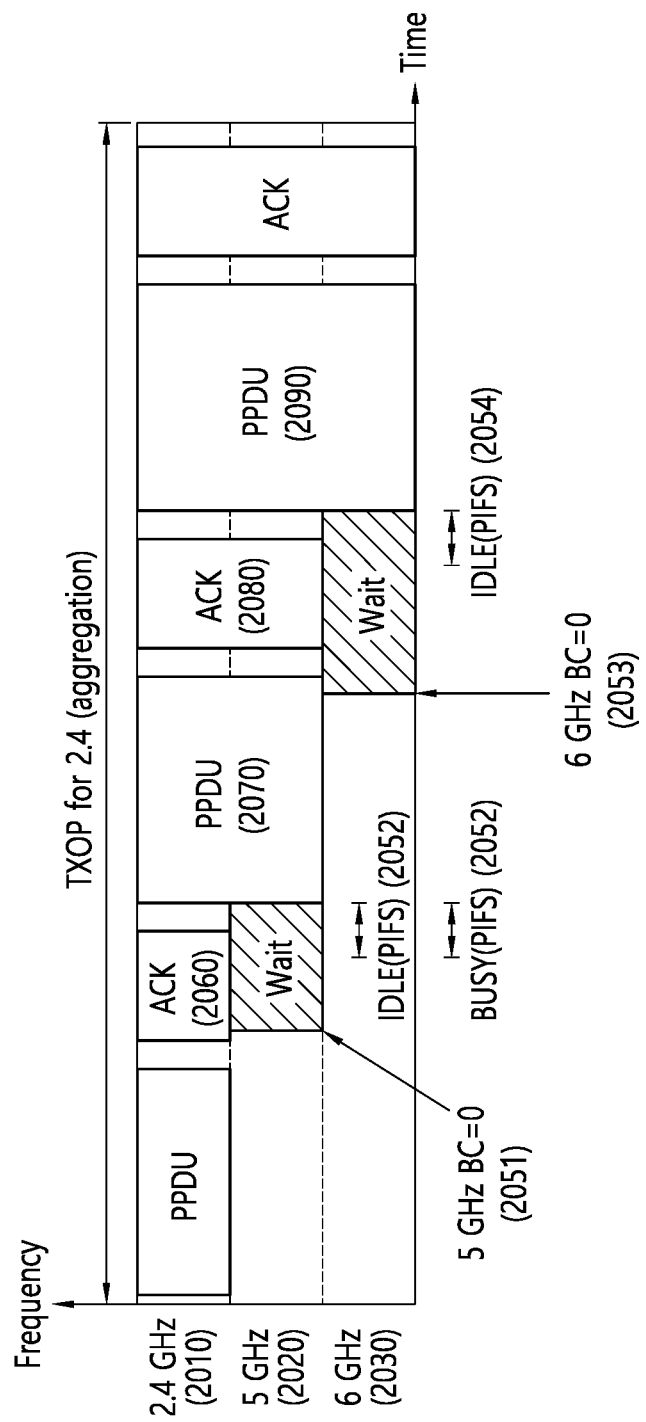
FIG. 20 illustrates another example of an operation of performing multi-link communication in a TXOP.

FIG. 20 illustrates another example of an operation of performing multi-link communication in a TXOP.

FIG. 20 is another view for describing an embodiment to which the aforementioned method B-3 is applied. Referring to FIG. 20, the transmitting STA may set a TXOP for a first link 2010. For example, the first link 2010 may include at least one of the channels in a 2.4 GHz band. The second link 2020 may include at least one of the channels in a 5 GHz band. The third link 2030 may include at least one of the channels in a 6 GHz band. The transmitting STA may confirm that a BC value of the second link 2020 is the first value (e.g., {0}) at a point in time 2050. The transmitting STA may make the second link 2020 wait from a first point in time 2051 upon confirming that the BC value for the second link 2020 is the first value. Thereafter, the transmitting STA may receive a first ACK 2060. The transmitting STA may determine (or check) whether the second link 2020 and the third link 2030 are idle in a first period 2052. The first period 2052 may include, for example PIFS, AIFS, or one slot. The transmitting STA may confirm that the second link 2020 is idle in the first period 2052. The transmitting STA may confirm that the third link 2030 is busy in the first period 2052. Thereafter, the transmitting STA may transmit a first packet 2070 through the aggregated first and second links 2010 and 2020. The first packet 2070 may include a PPDU. The transmitting STA may include information about the TXOP in the first packet 2070. The transmitting STA may transmit the first packet 2070 including the information about the TXOP. For example, the transmitting STA may include information about the remaining TXOP in the MAC duration/ID field of the first packet 2070 and transmit the packet.

The transmitting STA may confirm that a BC value for the third link 2030 is the first value (e.g., {0}) at a second point in time 2053. The transmitting STA may make the third link 2030 wait from the second point in time 2053 upon confirming that the BC value for the third link 2030 is the first value. Thereafter, the transmitting STA may receive a second ACK 2080. The transmitting STA may determine (or check) whether the third link 2030 is idle in a second period 2054. Then, the transmitting STA may transmit a second packet 2090 through the aggregated first, second, and third links 2010, 2020, and 2030. The second packet may include a PPDU. The transmitting STA may include information about the TXOP in the second packet 2090 and transmit the second packet 2090. For example, the transmitting STA may include information about the remaining TXOP in the MAC duration/ID field of the second packet 2090 and transmit the second packet 2090.

Figure 21:
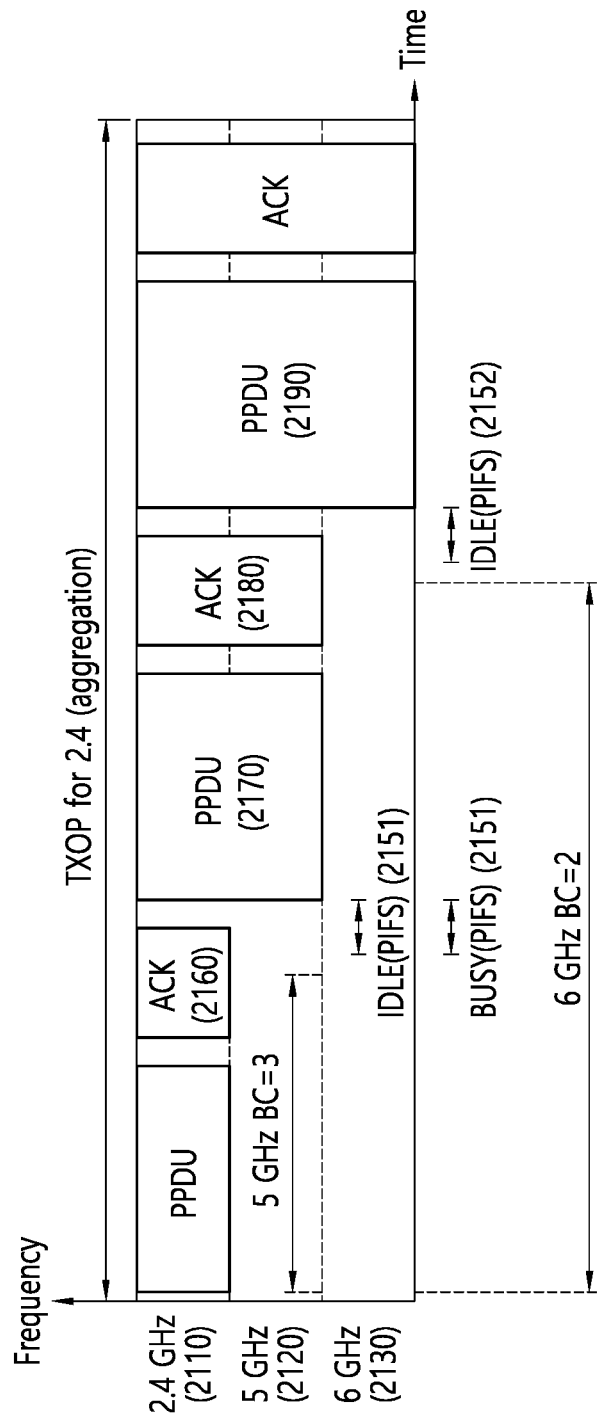
FIG. 21 illustrates another example of an operation of performing multi-link communication in a TXOP.

FIG. 21 illustrates another example of an operation of performing multi-link communication in a TXOP.

FIG. 21 is a view for describing an embodiment to which the aforementioned method B-4 is applied. The transmitting STA may set a TXOP for a first link 2110. The first link 2110 may include at least one of the channels in a 2.4 GHz band. The second link 2120 may include at least one of the channels in a 5 GHz band. The third link 2130 may include at least one of the channels in a 6 GHz band. The transmitting STA may check a BC value for the second link 2120 and a BC value for the third link 2130. For example, the transmitting STA may confirm that the BC value for the second link 2120 is a second value (e.g., {3}) different from the first value (e.g., {0}). The transmitting STA may confirm that the BC value for the second link 2130 is a third value (e.g., {2}). Thereafter, the transmitting STA may receive a first ACK 2160 through the first link 2110. The transmitting STA may determine (or check) whether the second link 2120 and the third link 2130 are idle in a first period 2151 based on the first ACK 2160. For example, the transmitting STA may confirm that the second link 2120 is idle and the third link 2130 is busy in the first period 2151. The transmitting STA may aggregate the first link 2110 and the second link

2120. The transmitting STA may transmit a first packet 2170 through the aggregated first and second links 2110 and 2120. The first packet 2170 may include a PPDU. Thereafter, the transmitting STA may receive a second ACK 2180. The transmitting STA may determine (or check) whether the third link 2130 is idle in a second period 2152. For example, the transmitting STA may confirm that the third link 2130 is idle in the second period 2152. The transmitting STA may aggregate the first link 2110, the second link 2120, and the third link 2130. The transmitting STA may transmit a second packet 2190 through the aggregated first, second, and third links 2110, 2120, and 2130. The second packet 2190 may include a PPDU. The transmitting STA may include information about the TXOP in the second packet 2190 and transmit the second packet 2190. For example, the transmitting STA may include information about the remaining TXOP in the MAC duration/ID field of the second packet 2190 and transmit the second packet 2190.

Figure 22:
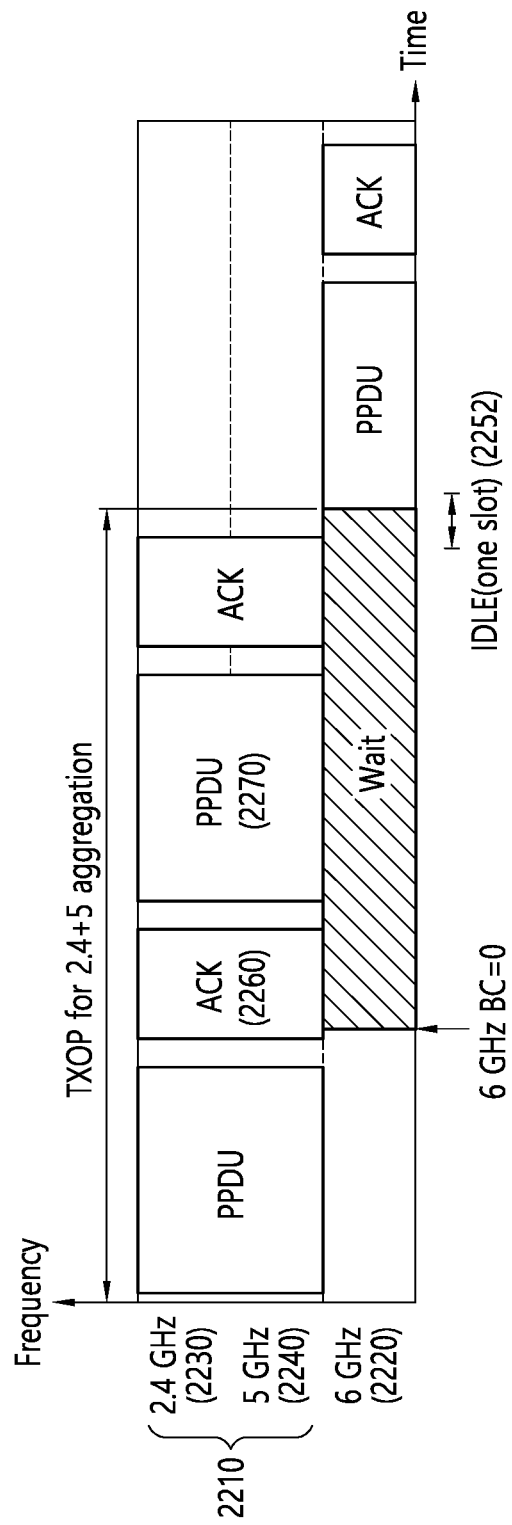
FIG. 22 illustrates an example of an operation of performing multi-link communication when a TXOP ends.
Figure 23:
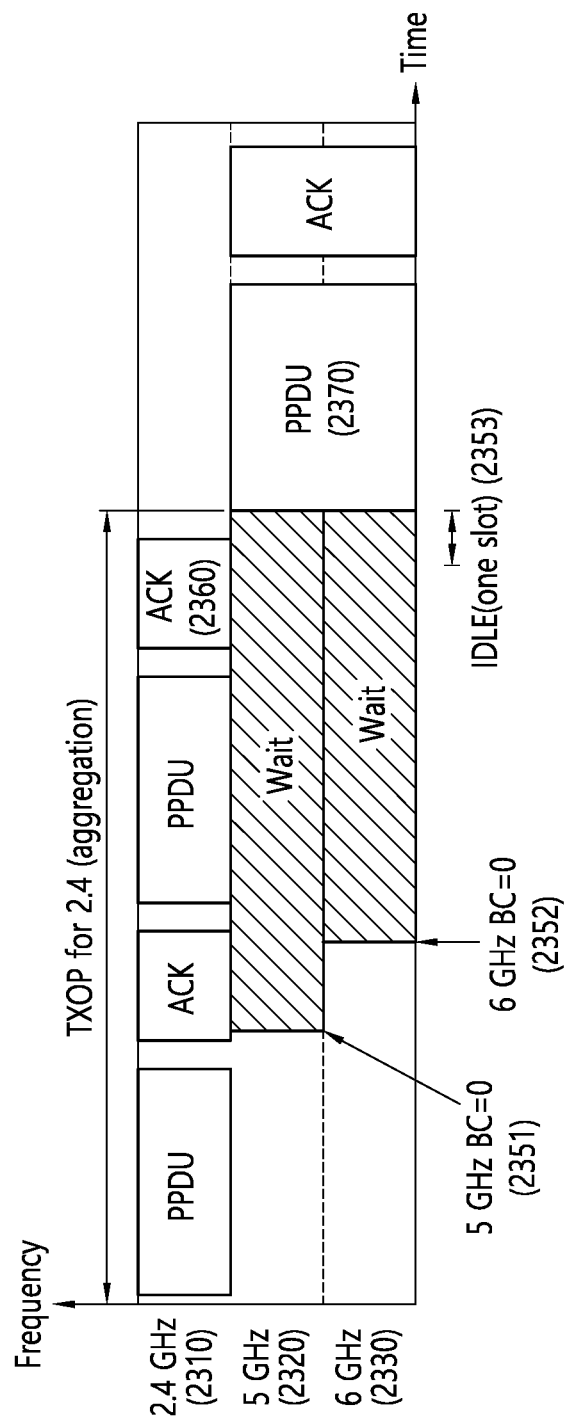
FIG. 23 illustrates another example of an operation of performing multi-link communication when a TXOP ends.
Figure 24:
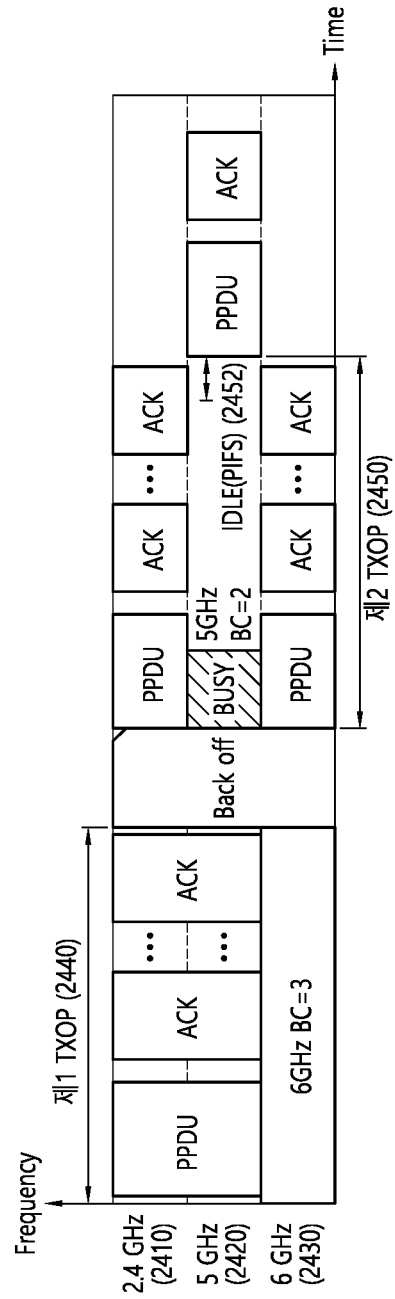
FIG. 24 illustrates another example of an operation of performing multi-link communication when a TXOP ends.

While FIGS. 18 to 21 illustrate operations with respect to a link, which is not aggregated at the time of acquisition of a TXOP, in the TXOP, FIGS. 22 to 24 illustrate operations with respect to a link that is not aggregated when a TXOP ends. Hereinafter, a method of adjusting a BC value for a link that is not aggregated in a designated time period before a TXOP ends and a normal operation process of a transmitting STA with respect to this method will be described.

In the present disclosure, a method of adjusting a BC value depending on a CCA result when a TXOP ends in a link through which communication through multi-link aggregation is not performed, and an operation of a transmitting STA when a BC value is the first value (e.g., {0}) are described. The transmitting STA may apply method B-5 to method B-8 in order to adjust a BC value for a link through which communication through multi-link aggregation is not performed when a TXOP ends. For convenience of description, it may be assumed that the transmitting STA adjusts a BC value for a second link when a TXOP set for a first link ends. The first link may include any channel (e.g., 20/40/80/160/240/320 MHz channel) in a first band (e.g., 2.4 GHz, 5 GHz, or 6 GHz). The second link may include any channel (e.g., 20/40/80/160/240/320 MHz channel) in a second band (e.g., 2.4 GHz, 5 GHz, or 6 GHz). A BC value of a primary channel of the first link may be represented as a BC value for the first link in the following. A BC value of a primary channel of the second link may be represented as a BC value for the second link.

Method 5: a method of transmitting a packet, by the transmitting STA, through the second link if a BC value for the second link is the first value (e.g., {0}) when the TXOP ends and the primary channel of the second link is idle for a designated time period.

The transmitting STA may receive a final ACK in the TXOP. The transmitting STA may acquire (or check) a BC value for the second link when the TXOP ends. The transmitting STA may confirm that the BC value for the second link is the first value (e.g., {0}) when the TXOP ends. Further, the transmitting STA may determine whether the primary channel of the second link is idle for a designated time period. The transmitting STA may transmit a subsequent packet through the second link when the primary channel of the second link is idle for the designated time period.

Method B-6: a method of aggregating the first link and the second link and transmitting a packet, by the transmitting STA, if a BC value for the second link is the first value (e.g., {0}) when the TXOP ends and the primary channel of the first link and the primary channel of the second link are idle for a designated time period.

The transmitting STA may confirm that the TXOP set for the first link ends. The transmitting STA may acquire (or check) a BC value for the second link when the TXOP ends. For example, the transmitting STA may confirm that the BC value for the second link is the first value (e.g., {0}) when the TXOP ends. Further, the transmitting STA may determine (or check) whether the primary channel of the second link is idle for a designated time period. Additionally, the transmitting STA may determine (or check) whether the primary channel of the first link which has been used for transmission in the TXOP is idle for the designated time period. The transmitting STA may aggregate the first link and the second link when the primary channel of the first link and the primary channel of the second link are idle for the designated time period. The transmitting STA may transmit a packet through the aggregated first and second links. In this case, the transmitting STA can exclusively use the first link and the second link.

Method B-7: a method of transmitting a packet, by the transmitting STA, when the primary channel of the second link is idle irrespective of a BC value at the time of ending of the TXOP.

The transmitting STA may confirm that the TXOP set for the first link ends. The transmitting STA may acquire (or check) a BC value for the second link when the TXOP ends. The transmitting STA may determine whether the primary channel of the second link is idle for a designated time period. The transmitting STA may transmit a subsequent packet through the second link irrespective of the BC value for the second link when the primary channel of the second link is idle for the designated time period. In this case, the transmitting STA can reduce transmission latency.

Method B-8: a method of maintaining a backoff procedure, by the transmitting STA, if a BC value is not the first value (e.g., {0}) when the TXOP ends.

The transmitting STA may confirm that the TXOP set for the first link ends. The transmitting STA may acquire (or check) a BC value for the second link when the TXOP ends. The transmitting STA may maintain the backoff procedure when the BC value for the second link is not the first value.

FIG. 22 illustrates an example of an operation of performing multi-link communication when a TXOP ends.

FIG. 22 is a view for describing the above-described method B-2 and method B-5. Referring to FIG. 22, a transmitting STA may set a TXOP for a first link 2210. The transmitting STA may transmit and/or receive packets (e.g., PPDU or ACK) in the TXOP. The first link 2210 may include aggregated third and fourth links 2230 and 2240. The transmitting STA may include an STA supporting a second link 2220, the third link 2230 and/or the fourth link 2240. For example, the second link 2220 may include at least one of the channels in a 6 GHz band. The third link 2230 may include at least one of the channels in a 2.4 GHz band. The fourth link 2240 may include at least one of the channels in a 5 GHz band.

The operation of the transmitting STA to transmit a packet in the TXOP may correspond to the above-described method B-2 and/or FIG. 18. The transmitting STA may maintain a BC value for the second link 2220 as the first value (e.g., {0}) in the TXOP. The transmitting STA may receive a final ACK 2260 in the TXOP. Thereafter, the transmitting STA may determine (or check) whether the primary channel of the second link 2220 is idle in a first period 2252 before the TXOP ends. The transmitting STA may confirm that the primary channel of the second link 2220 is idle. The transmitting STA may transmit a packet 2270 through the second link 2220 after the TXOP ends. The packet 2270 may include a PPDU.

FIG. 23 illustrates an operation of performing multi-link communication when a TXOP ends.

FIG. 23 is another view for describing the above-described method B-2 and method B-5. Referring to FIG. 23, a transmitting STA may set a TXOP for a first link 2310. The transmitting STA may transmit or receive a packet in the TXOP. The transmitting STA may include an STA supporting the first link 2310, a second link 2320, and/or a third link 2330. For example, the first link 2310 may include at least one of the channels in a 2.4 GHz band. The second link 2320 may include at least one of the channels in a 5 GHz band. The third link 2330 may include at least one of the channels in a 6 GHz band.

The transmitting STA may acquire (or check) a BC value for the second link 2320 and/or a BC value for the third link 2330 in the TXOP set for the first link 2310. When the BC value for the second link 2320 is not the first value (e.g., {0}), the transmitting STA may check a first point in time 2351 at which the BC value for the second link 2320 becomes the first value. The transmitting STA may make the second link 2320 wait until the TXOP ends from the first point in time 2351. The transmitting STA may maintain the BC value for the second link 2320 as the first value (e.g., {0}) in the TXOP. As in the case of the second link 2320, when the BC value for the third link 2330 is not the first value, the transmitting STA may check a second point in time 2352 at which the BC value for the third link 2330 becomes 0. The transmitting STA may make the third link 2330 wait until the TXOP ends from the second point in time 2352. The transmitting STA may maintain the BC value for the third link 2330 as the first value (e.g., {0}) in the TXOP.

The transmitting STA may receive a final ACK 2360 in the TXOP. Thereafter, the transmitting STA may determine (or check) whether the primary channel of the second link 2220 and the primary channel of the third link 2330 are idle. The transmitting STA may confirm that the primary channel of the second link 2320 and the primary channel of the third link 2330 are idle in a first time period 2353 before the TXOP ends. The first time period 2353 may include PIFS, AIFS, or one slot. The transmitting STA may aggregate the second link 2320 and the third link 2330 after the TXOP ends. The transmitting STA may transmit a packet 2370 through the aggregated second and third links 2320 and 2330 after the TXOP ends. The packet 2270 may include a PPDU.

FIG. 24 illustrates an operation of performing multi-link communication when a TXOP ends.

FIG. 24 is another view for describing the above-described method A, method B-7, and method B-8. Referring to FIG. 24, a transmitting STA may aggregate a first link 2410 and a second link 2420. The transmitting STA may acquire a first TXOP 2440 for the aggregated first and second links 2410 and 2420. The transmitting STA may transmit or receive a packet (e.g., PPDU or ACK) through the aggregated first and second links 2410 and 2420 in the first TXOP 2440. The transmitting STA may include an STA supporting the first link 2410, the second link 2420, and/or a third link 2430. For example, the first link 2410 may include at least one of the channels in a 2.4 GHz band. The second link 2420 may include at least one of the channels in a 5 GHz band. The third link 2430 may include at least one of the channels in a 6 GHz band.

The transmitting STA may acquire (or check) a BC value for the third link 2430 in the first TXOP 2440 acquired for the aggregated first and second links 2410 and 2420. For example, the transmitting STA may confirm that the BC value for the third link 2430 is the second value (e.g., {3}) different from the first value (e.g., {0}). The transmitting STA may maintain the BC value for the third link 2430 as the second value until the first TXOP 2440 ends. The transmitting STA may perform a backoff procedure when the first TXOP 2440 ends. The transmitting STA may acquire a second TXOP 2450 after execution of the backoff procedure. The transmitting STA may check links that can be aggregated from among the first link 2410, the second link 2420, and/or the third link 2430 and aggregate the links. For example, the transmitting STA may confirm that the first link 2410 and the third link 2430 can be aggregated and aggregate the first link 2410 and the third link 2430. Here, the transmitting STA may confirm that the second link 2420 is busy. Further, the transmitting STA may confirm that the BC value for the second link 2420 is the third value (e.g., {2}) instead of the first value (e.g., {0}). The transmitting STA may maintain the BC value for the second link 2420 as the third value in the second TXOP 2450. The transmitting STA may transmit a packet through the aggregated first and third links 2410 and 2430 in the second TXOP 2450. The transmitting STA may receive a final ACK 2460 in the second TXOP 2450. Thereafter, the transmitting STA may determine whether the primary channel of the second link 2420 is idle for a first time period 2452 before the second TXOP ends. For example, the transmitting STA may transmit a packet through the second link 2420 after the second TXOP 2450 ends upon confirming that the primary channel of the second link 2420 is idle. The packet may include a PPDU.

Figure 25:
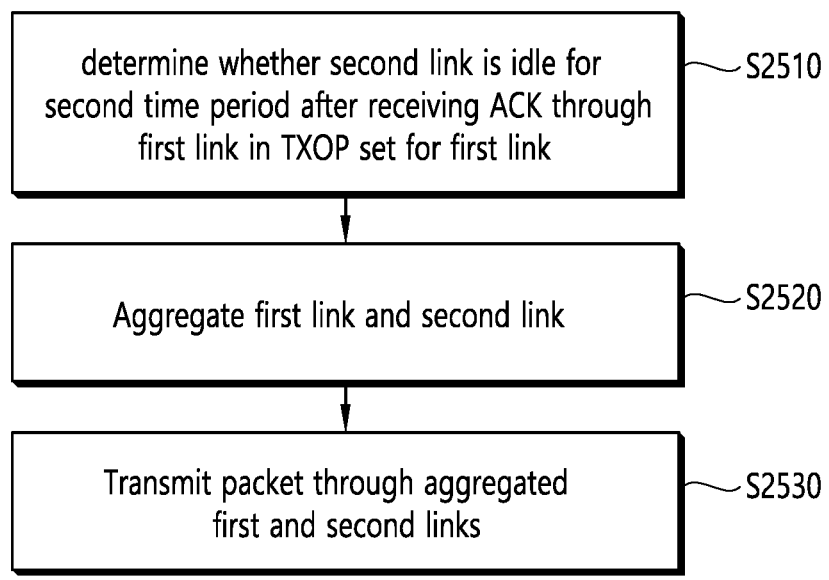
FIG. 25 is a flowchart for describing a packet transmission operation of a transmitting STA.

FIG. 25 is a flowchart for describing a packet transmission operation of a transmitting STA.

In step S2510, the transmitting STA may receive ACK through a first link (e.g., the first link 2010 in FIG. 20) in a TXOP set for the first link and then determine whether a second link (e.g., the second link 2020 in FIG. 20) is idle for a first time period (e.g., the first period 2052 in FIG. 20). The transmitting STA may set the TXOP for the first link. The first link may include any one channel (e.g., 20/40/80/160/240/320 MHz channel) in a first band (e.g., 2.4 GHz, 5 GHz, or 6 GHz), and the second link may include any one channel (e.g., 20/40/80/160/240/320 MHz channel) in a second band (e.g., 2.4 GHz, 5 GHz, or 6 GHz). The transmitting STA may receive ACK through the first link in the TXOP. The transmitting STA may determine whether the second link is idle for the first time period after reception of the ACK. The first time period may include, for example, PIFS, AIFS, or one slot.

According to an embodiment, the transmitting STA can determine whether the second link is idle for the first time period when a BC value for the second link is the first value (e.g., {0}). According to an embodiment, the transmitting STA may determine whether the second link is idle for the first time period irrespective of the BC value for the second link.

The transmitting STA may determine whether the second link is idle for the first time period through clear channel assessment (CCA). For example, the transmitting STA may determine that the second link is idle for the first time period through ED/CCA when an RSSI value of the second link does not exceed a threshold level. As another example, the transmitting STA may determine that the second link is idle for the first time period through CS/CCA.

In step S2520, the transmitting STA may aggregate the first link and the second link. For example, the first link may include a link of a 40 MHz band. The second link may include a link of an 80 MHz band. The transmitting STA can aggregate the first link and the second link into a 120 MHz band.

In step S2530, the transmitting STA may transmit a packet through the aggregated first and second links. The transmitting STA may transmit the packet in the synchronous mode or the asynchronous mode. When the transmitting STA operates in the synchronous mode, the transmitting STA may transmit or receive the packet through the first link and the second link at a designated point in time. When the transmitting STA operates in the asynchronous mode, the transmitting STA may transmit or receive the packet at different points in time for respective links.

The packet (e.g., PPDU) transmitted through the aggregated first and second links may include information about the TXOP. For example, the transmitting STA may include information about the remaining TXOP in a MAC duration/ID field of the packet and transmit the packet. In addition, the transmitting STA may change a PHY indication including information about a bandwidth and a link (or band) in the packet.

The transmitting STA may determine whether a third link (e.g., the third link 2030 in FIG. 20) is idle for a second time period (e.g., the second period 2054 in FIG. 20) in order to start communication through the third link after the TXOP. The third link may include any one channel (e.g., 20/40/80/160/240/320 MHz channel) in a third band (e.g., 2.4 GHz, 5 GHz, or 6 GHz). The second time period may include, for example, PIFS, AIFS, or one slot. For example, the transmitting STA may determine whether the third link is idle for the second time period through CCA.

The transmitting STA may determine whether to start communication through the third link based on determination with respect to the third link. For example, the transmitting STA may not start communication through the third link when the third link is busy for the second time period. As another example, the transmitting STA may start communication through the third link when the third link is idle for the second time period.

The transmitting STA may acquire a BC value for the third link for the TXOP. According to an embodiment, the transmitting STA may reduce the BC value for the third link for the TXOP after acquisition of the BC value for the third link. According to an embodiment, the transmitting STA may maintain the BC value for the third link without reducing it after acquisition of the BC value for the third link. The transmitting STA may determine whether to start communication through the third link based on the BC value for the third link and whether the third link is idle for the second time period. For example, the transmitting STA may start communication through the third link when the BC value for the third link is the first value (e.g., {0}) and the third link is idle for the second time period. As another example, the transmitting STA may start communication through the third link when the third link is idle for the second time period irrespective of whether the BC value for the third link is the first value.

Figure 26:
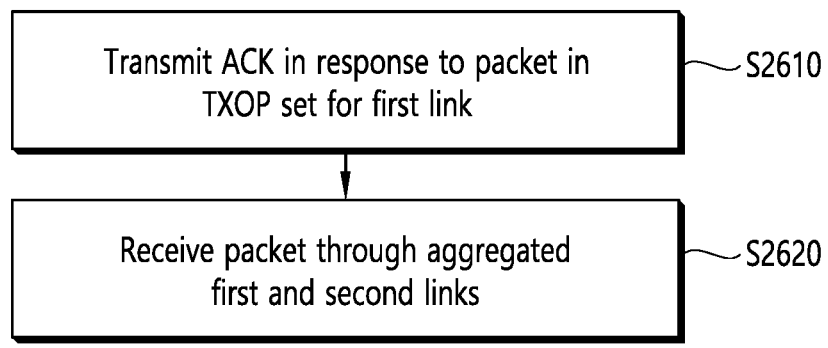
FIG. 26 is a flowchart for describing a packet reception operation of a transmitting STA.

FIG. 26 is a flowchart for describing a packet reception operation of a receiving STA.

Referring to FIG. 26, the receiving STA may transmit ACK in response to a packet in a TXOP set for a first link (e.g., the first link 2010 in FIG. 20) in step S2610. The receiving STA may include an STA supporting the first link and a second link (e.g., the second link 2020 in FIG. 20). The receiving STA may receive the packet from a transmitting STA through the first link in the TXOP set for the first link. The receiving STA may transmit ACK to the transmitting STA in response to the packet through the first link in the TXOP. The first link may include any one channel (e.g., 20/40/80/160/240/320 MHz channel) in a first band (e.g., 2.4 GHz, 5 GHz, or 6 GHz), and the second link may include any one channel (e.g., 20/40/80/160/240/320 MHz channel) in a second band (e.g., 2.4 GHz, 5 GHz, or 6 GHz).

In step S2620, the receiving STA may receive a packet through the aggregated first and second links. For example, the first link may include a link of a 40 MHz band. The second link may include a link of an 80 MHz band. The receiving STA can receive the packet through a 120 MHz band.

The receiving STA may receive the packet in the synchronous mode or the asynchronous mode. When the receiving STA operates in the synchronous mode, the receiving STA may transmit or receive the packet through the first link and the second link at a designated point in time. When the receiving STA operates in the asynchronous mode, the receiving transmitting STA may transmit or receive the packet at different points in time for respective links.

The packet (e.g., PPDU) transmitted through the aggregated first and second links may include information about the TXOP. For example, the receiving STA may acquire information about the remaining TXOP through a MAC duration/ID field of the packet. The receiving STA may acquire information about a bandwidth and a link (or band) in the packet through a PHY indication.

The receiving STA may support a third link (e.g., the third link 2030 in FIG. 20) in addition to the first link and the second link. The receiving STA may receive a packet from the transmitting STA through the aggregated first to third links.

Figure 27:
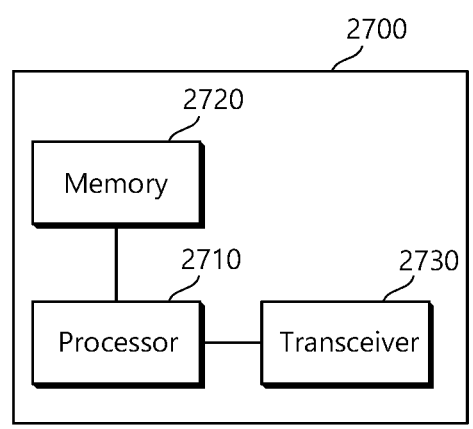
FIG. 27 illustrates a transmitting STA or a receiving STA to which an example of the present disclosure is applied.

FIG. 27 illustrates a transmitting STA or a receiving STA to which an example of the present disclosure is applied.

Referring to FIG. 27, the STA 2700 may include a processor 2710, a memory 2720, and a transceiver 2730. The features of FIG. 27 may be applied to a non-AP STA or an AP STA. The illustrated processor, memory, and transceiver may be implemented as separate chips, or at least two or more blocks/functions may be implemented through a single chip.

The illustrated transceiver 2730 performs a signal transmission/reception operation. Specifically, the transceiver 2730 may transmit and receive IEEE 802.11 packets (e.g., IEEE 802.11a/b/g/n/ac/ax/be, etc.).

The processor 2710 may implement the functions, processes, and/or methods proposed in the present disclosure. Specifically, the processor 2710 may receive a signal through the transceiver 2730, process the received signal, generate a transmission signal, and perform control for signal transmission.

The processor 2710 may include an application-specific integrated circuit (ASIC), another chipset, a logic circuit, and a data processing device. The memory 2720 may include read-only memory (ROM), random access memory (RAM), flash memory, memory card, storage medium, and/or other storage device.

The memory 2720 may store a signal (i.e., a reception signal) received through the transceiver and may store a signal (i.e., a transmission signal) to be transmitted through the transceiver. That is, the processor 2710 may acquire the received signal through the memory 2720 and store the signal to be transmitted in the memory 2720.

Figure 28:
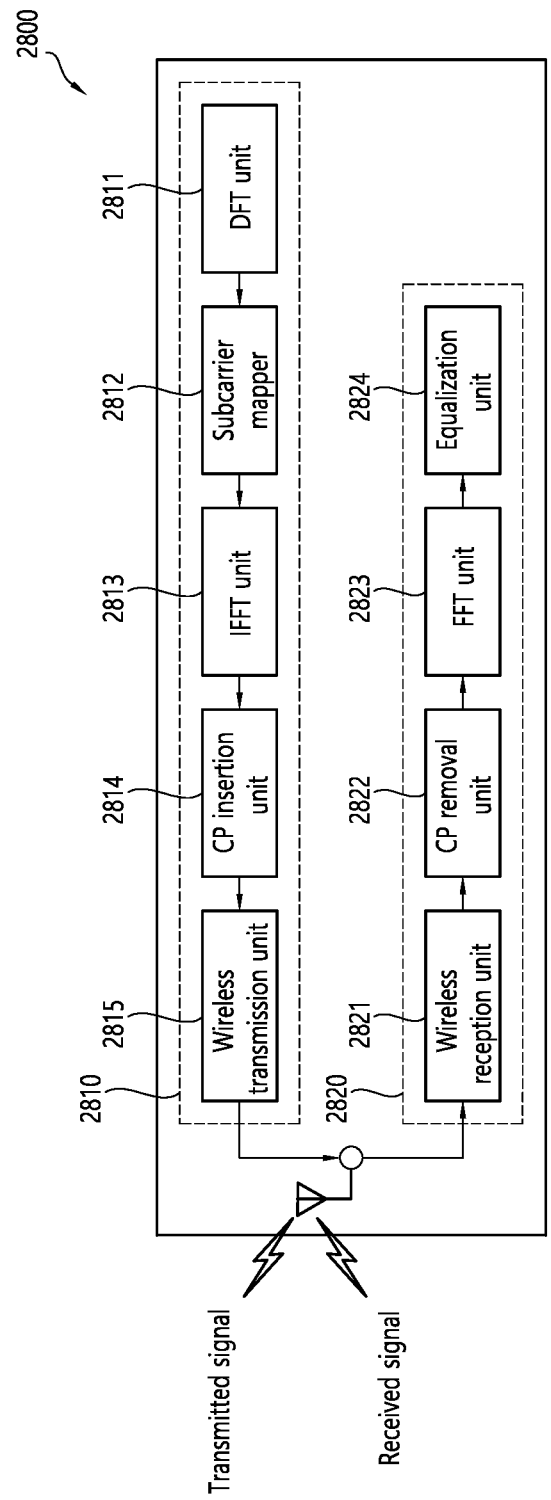
FIG. 28 illustrates another example of a detailed block diagram of a transceiver.

FIG. 28 illustrates another example of a detailed block diagram of a transceiver. Some or all blocks of FIG. 28 may be included in the processor 2710. Referring to FIG. 28, a transceiver 2800 includes a transmission part 2801 and a reception part 2802. The transmission part 2801 includes a discrete Fourier transform (DFT) unit 2811, a subcarrier mapper 2812, an IDFT/(inverse fast Fourier transform) IFFT unit 2813, a CP insertion unit 2814, and a wireless transmission unit 2815. The transmission part 2801 may further include a modulator. In addition, for example, the transmission part 2801 may further include a scramble unit (not shown), a modulation mapper (not shown), a layer mapper (not shown), and a layer permutator (not shown), and these components may be arranged before the DTF unit 2811. That is, in order to prevent an increase in a peak-to-average power ratio (PAPR), the transmission part 2801 allows information to first go through first the DFT unit 2811 before mapping a signal to a subcarrier. After a signal spread by the DFT unit 2811 (or precoded in the same sense) is mapped through the subcarrier mapper 2812, the mapped signal goes through the IDTF/IFFT unit 2813 so as to be generated as a signal on a time axis.

The DFT unit 2811 performs DFT on input symbols and outputs complex-valued symbols. For example, when Ntx symbols are input (here, Ntx is a natural number), a DFT size is Ntx. The DFT unit 2811 may be referred to as a transform precoder. The subcarrier mapper 2812 maps the complex-valued symbols to each subcarrier in a frequency domain. The complex symbols may be mapped to resource elements corresponding to a resource block allocated for data transmission. The subcarrier mapper 2812 may be referred to as a resource element mapper. The IDFT/IFFT unit 2813 performs IDFT/IFFT on an input symbol and outputs a baseband signal for data as a time domain signal. The CP insertion unit 2814 copies a rear part of the base band signal for data and inserts it into a front part of the base band signal for data. Inter-symbol interference (ISI) and inter-carrier interference (ICI) may be prevented through CP insertion, so that orthogonality may be maintained even in a multipath channel.

Meanwhile, the receiving part 2802 includes a wireless reception unit 2821, a CP removal unit 2822, an FFT unit 2823, an equalization unit 2824, and the like. The wireless reception unit 2821, the CP removing unit 2822, and the FFT unit 2823 of the receiving part 2802 perform reverse functions of the wireless transmission unit 2815, the CP inserting unit 2814, and the IFF unit 2813 of the transmitting part 2801. The receiving part 2802 may further include a demodulator.

In addition to the illustrated blocks, the transceiver of FIG. 28 may include a reception window controller (not shown) extracting a part of a received signal and a decoding operation processing unit (not shown) performing a decoding operation on a signal extracted through a reception window.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method in a wireless local area network (WLAN) system, comprising:
   transmitting, by a station (STA), a Probe Request frame comprising capability information,
   wherein the capability information comprises identification information of a plurality of links supported by the STA and 6 GHz capability information related to whether the STA supports a 6 GHz link;
   obtaining, by the STA, a transmission opportunity (TXOP) for a pre-defined link which is different from the 6 GHz link;
   transmitting, by the STA, a physical protocol data unit (PPDU) through the pre-defined link;
   receiving, by the STA, an ACKnowledgement (ACK) frame for the PPDU through the pre-defined link;
   determining, by the STA, whether a backoff counter (BC) value of the 6 GHz link reaches zero after receiving the ACK frame;
   determining, by the STA, whether the 6 GHz link is maintained to be idle for a pre-defined time period after the BC value of the 6 GHz link reaches zero;
   aggregating, by the STA, the pre-defined link and the 6 GHz link based on the determination; and
   transmitting, by the STA, a packet through the aggregated links.

2. A transmitting device, comprising:
   a transceiver for transmitting/receiving RF signals; and
   a processor connected to the transceiver,
   wherein the processor is configured to:
      transmit a Probe Request frame comprising capability information,
      wherein the capability information comprises identification information of a plurality of links supported by the STA and 6 GHz capability information related to whether the STA supports a 6 GHz link;
      obtain a transmission opportunity (TXOP) for a pre-defined link which is different from the 6 GHz link;
      transmit a physical protocol data unit (PPDU) through the pre-defined link;
      receive an ACKnowledgement (ACK) frame for the PPDU through the pre-defined link;
      determine whether a backoff counter (BC) value of the 6 GHz link reaches zero after receiving the ACK frame;
      determine whether the 6 GHz link is maintained to be idle for a pre-defined time period after the BC value of the 6 GHz link reaches zero;
      aggregate the pre-defined link and the 6 GHz link based on the determination; and
      transmit a packet through the aggregated links.

3. The STA of claim 2, wherein the pre-defined link comprises at least one of a 2.4 GHz link and a 5 GHz link.

4. The STA of claim 2, wherein the pre-defined time period is a Point coordination function InterFrame Space (PIFS) duration.

5. The STA of claim 2, wherein the aggregation of the pre-defined link and the 6 GHz link is performed when the 6 GHz link is maintained to be idle for the pre-defined time period after the BC value of the 6 GHz link reaches zero.

6. The STA of claim 2, wherein the STA determines whether the 6 GHz link is maintained to be idle based on clear channel assessment (CCA) sensing of the 6 GHz link.

7. The method of claim 1, wherein the pre-defined link comprises at least one of a 2.4 GHz link and a 5 GHz link.

8. The method of claim 1, wherein the pre-defined time period is a Point coordination function InterFrame Space (PIFS) duration.

9. The method of claim 1, wherein the aggregation of the pre-defined link and the 6 GHz link is performed when the 6 GHz link is maintained to be idle for the pre-defined time period after the BC value of the 6 GHz link reaches zero.

10. The method of claim 1, wherein the STA determines whether the 6 GHz link is maintained to be idle based on clear channel assessment (CCA) sensing of the 6 GHz link.

* * * * *